(12) United States Patent
Hayakawa et al.

(10) Patent No.: US 11,906,641 B2
(45) Date of Patent: Feb. 20, 2024

(54) WORK MACHINE

(71) Applicant: HITACHI CONSTRUCTION MACHINERY CO., LTD., Tokyo (JP)

(72) Inventors: Naoki Hayakawa, Ushiku (JP); Shiho Izumi, Hitachinaka (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 256 days.

(21) Appl. No.: 17/274,923

(22) PCT Filed: Jun. 6, 2019

(86) PCT No.: PCT/JP2019/022620
§ 371 (c)(1),
(2) Date: Mar. 10, 2021

(87) PCT Pub. No.: WO2020/059220
PCT Pub. Date: Mar. 26, 2020

(65) Prior Publication Data
US 2022/0026587 A1  Jan. 27, 2022

(30) Foreign Application Priority Data
Sep. 21, 2018  (JP) ................. 2018-178039

(51) Int. Cl.
G01S 19/48  (2010.01)
E02F 3/32  (2006.01)
(Continued)

(52) U.S. Cl.
CPC ............ *G01S 19/485* (2020.05); *G01S 19/48* (2013.01); *E02F 3/32* (2013.01); *E02F 3/435* (2013.01);
(Continued)

(58) Field of Classification Search
CPC ........ G01S 19/485; G01S 19/40; G01S 19/45; G01S 19/48; G01S 19/51; E02F 3/32; E02F 3/435; E02F 9/262; E02F 9/264
(Continued)

(56) References Cited

U.S. PATENT DOCUMENTS 7,242,791 B2 * 7/2007 Han ..................... G05D 1/0278
701/28
8,412,418 B2 * 4/2013 Kumagai ............... G01C 11/06
701/50
(Continued)

FOREIGN PATENT DOCUMENTS

CN  101752218 A  6/2010
JP  2001-055762 A  2/2001
(Continued)

OTHER PUBLICATIONS

International Preliminary Report on Patentability received in corresponding International Application No. PCT/JP2019/022620 dated Mar. 25, 2021.
(Continued)

*Primary Examiner* — Chuong P Nguyen
(74) *Attorney, Agent, or Firm* — Mattingly & Malur, PC

(57) ABSTRACT

A coordinate conversion system including a controller that converts geographic-coordinate-system coordinates of a certain point into site-coordinate-system coordinates includes: an image-capturing device that captures an image of a reference point; and a GNSS antenna that receives a navigation signal. The controller calculates geographic-coordinate-system coordinates of the image-capturing device on the basis of the navigation signal received at the GNSS antenna, and a distance between the image-capturing device and the GNSS antenna; calculates a distance and direction from the image-capturing device to the reference point by performing image processing on the image of the reference (Continued)

point captured by the image-capturing device; calculates the geographic-coordinate-system coordinates of the reference point on the basis of the calculated distance and direction from the image-capturing device to the reference point, and the calculated geographic-coordinate-system coordinates of the image-capturing device; and calibrates the coordinate conversion parameter on the basis of the calculated geographic-coordinate-system coordinates of the reference point, and the site-coordinate-system coordinates of the reference point.

10 Claims, 10 Drawing Sheets

(51) Int. Cl.
*E02F 3/43* (2006.01)
*E02F 9/26* (2006.01)
*G01S 19/40* (2010.01)

(52) U.S. Cl.
CPC ............ *E02F 9/262* (2013.01); *E02F 9/264* (2013.01); *G01S 19/40* (2013.01)

(58) Field of Classification Search
USPC ............ 342/357.23, 357.28, 357.31, 357.34
See application file for complete search history.

(56) References Cited

U.S. PATENT DOCUMENTS

| | | | | |
|---|---|---|---|---|
| 9,540,794 | B2 * | 1/2017 | Iwamura | E02F 9/2285 |
| 10,094,662 | B1 * | 10/2018 | Kahle | G01S 1/7034 |
| 11,120,577 | B2 * | 9/2021 | Sugawara | E02F 9/264 |
| 11,195,351 | B2 * | 12/2021 | Kawamoto | E02F 9/267 |
| 11,434,623 | B2 * | 9/2022 | Hayakawa | G06T 7/73 |
| 11,441,294 | B2 * | 9/2022 | Kawamoto | G01S 5/163 |
| 2008/0162004 | A1 | 7/2008 | Price et al. | |
| 2010/0141755 | A1 | 6/2010 | Iwanaga et al. | |
| 2014/0277956 | A1 | 9/2014 | Morin | |
| 2017/0004345 | A1 | 1/2017 | Sasaki et al. | |
| 2017/0284071 | A1 * | 10/2017 | Yamaguchi | G06T 7/80 |
| 2020/0394726 | A1 * | 12/2020 | Nakano | G06Q 50/08 |
| 2021/0209799 | A1 | 7/2021 | Sugawara et al. | |
| 2021/0230842 | A1 * | 7/2021 | Vorobiev | G06T 7/50 |
| 2021/0293972 | A1 * | 9/2021 | Tamazato | G01C 15/00 |
| 2022/0170243 | A1 * | 6/2022 | Roh | E02F 9/2228 |

FOREIGN PATENT DOCUMENTS

| | | | | |
|---|---|---|---|---|
| JP | 2005-91298 W | | 4/2005 | |
| JP | 2012-202061 A | | 10/2012 | |
| JP | 2013-124954 A | | 6/2013 | |
| JP | 2017-015598 A | | 1/2017 | |
| JP | 7195663 B1 * | | 12/2022 | E02F 9/26 |
| WO | 2016148309 A1 | | 9/2016 | |
| WO | 2018/147340 A1 | | 8/2018 | |

OTHER PUBLICATIONS

International Search Report of PCT/JP2019/022620 dated Mar. 9, 2019.

Japanese Office Action received in corresponding Japanese Application No. 2018-178039 dated Mar. 28, 2023.

Chinese Office Action received in corresponding Chinese Application No. 201980057605.5 dated Nov. 29, 2023.

* cited by examiner

WORK MACHINE

TECHNICAL FIELD

The present invention relates to a coordinate conversion system that uses a coordinate conversion parameter to convert geographic-coordinate-system coordinates of a certain point into site-coordinate-system coordinates, and a work machine including the coordinate conversion system.

BACKGROUND ART

Computerized construction, in which the information communication technology is applied to construction carried out by work machines such as hydraulic excavators having work implements, utilizes a technology of generating data specifying the two-dimensional shape of a construction target (target surface) that should be formed with a work machine on the basis of design data specifying the three-dimensional shape of the construction target, and assisting the construction carried out by the work machine on the basis of the data of the target surface. This type of technology includes machine guidance (MG) in which the positional relation between a target surface and a work implement is displayed on a monitor, and machine control (MC) in which a work implement is semi-automatically controlled such that the work implement is kept above a target surface.

In MG and MC, it is demanded to accurately calculate the position of a control point set for a work implement (e.g. the position of the blade tip of a bucket positioned at the tip of the work implement; also referred to as a work point) on a machine-body coordinate system set for the hydraulic excavator or a geographic coordinate system. As a method for improving the precision of calculation of the position of a work point of this type, there is a method that uses a calibrating device that calibrates a plurality of parameters indicating the dimensions and oscillation angles of a boom, an arm, and a bucket. For example, Patent Document 1 discloses a calibrating device that calculates coordinate conversion information on the basis of information about the position of a first work point measured by an external measuring device, and information about the position of a second work point measured by the external measuring device, converts the coordinates of a plurality of positions of work points measured by the external measuring device (the concept of "coordinates" in this document covers each numerical value (coordinate value) included in the coordinates also) from coordinates in a coordinate system of the external measuring device into coordinates in a machine-body coordinate system of a hydraulic excavator by using the coordinate conversion information, and calculates a calibration value of a parameter on the basis of the coordinates of the plurality of positions of the work points having been converted into coordinates in the machine-body coordinate system.

PRIOR ART DOCUMENT

Patent Document

Patent Document 1: JP-2012-202061-A

SUMMARY OF THE INVENTION

Problem to be Solved by the Invention

There are also other matters to be noted for improving the degree of accuracy of the positions of control points of a work machine. Design data used in computerized construction is defined on a certain coordinate system by using three-dimensional CAD software or the like (this coordinate system is referred to as a "site coordinate system" in this document). On the other hand, the positions of control points of a work machine are calculated as coordinates on a geographic coordinate system (e.g. the latitude, the longitude, and the ellipsoidal height) on the basis of signals (navigation signals) from a navigation satellite received by GNSS (Global Navigation Satellite Systems) antennas mounted on the work machine. Accordingly, in order to implement MG or MC described above on a site coordinate system, it is necessary to convert the position (coordinates) of a control point of a work machine on a geographic coordinate system into coordinates on the site coordinate system. In this coordinate conversion, a preset coordinate conversion parameter is used.

The coordinate conversion parameter is computed in the following manner before the start of construction. A plurality of fixed reference points such as stakes are installed to surround an entire work site, site-coordinate-system coordinates and geographic-coordinate-system coordinates of each fixed reference point are acquired, and the coordinate conversion parameter is computed on the basis of the coordinates in the two types of coordinate system. It should be noted however that site-coordinate-system coordinates are measured by a total station or the like, and geographic-coordinate-system coordinates are measured by satellite positioning by using GNSS or the like. The latter geographic-coordinate-system coordinates measured by satellite positioning can vary from moment to moment due to various factors such as the arrangement of satellites or the condition of the ionosphere. Accordingly, preferably, in terms of the improvement of the precision of conversion from geographic-coordinate-system coordinates into site-coordinate-system coordinates, the coordinate conversion parameter is altered (calibrated) according to variations of satellite positioning results.

An object of the present invention is to provide a coordinate conversion system that can easily generate (calibrate) a coordinate conversion parameter for conversion from geographic-coordinate-system coordinates into site-coordinate-system coordinates according to variations of satellite positioning results, and a work machine including the coordinate conversion system.

Means for Solving the Problem

The present application includes a plurality of means for solving the problem described above, and one example thereof is a coordinate conversion system including a controller that is configured to convert geographic-coordinate-system coordinates of a certain point into site-coordinate-system coordinates by using a coordinate conversion parameter generated on a basis of geographic-coordinate-system coordinates and site-coordinate-system coordinates of a reference point installed at a work site, the coordinate conversion system including: an image-capturing device that captures an image of the reference point; and a GNSS antenna that receives a navigation signal. The controller is configured to calculate geographic-coordinate-system coordinates of the image-capturing device on a basis of the navigation signal received at the GNSS antenna, and a distance between the image-capturing device and the GNSS antenna, calculate a distance and direction from the image-capturing device to the reference point by performing image processing on the image of the reference point captured by the image-capturing device, calculate the geographic-coordinate-system coordinates of the reference point on a basis of the calculated distance and direction from the image-capturing device to the reference point, and the calculated geographic-coordinate-system coordinates of the image-capturing device, and calibrate the coordinate conversion parameter on a basis of the calculated geographic-coordinate-system coordinates of the reference point, and the site-coordinate-system coordinates of the reference point.

Advantages of the Invention

According to the present invention, it is possible to easily generate a coordinate conversion parameter for conversion from geographic-coordinate-system coordinates into site-coordinate-system coordinates according to variations of satellite positioning results.

MODES FOR CARRYING OUT THE INVENTION

Hereinafter, embodiments of the present invention are explained by using the drawings. Note that although, hereinafter, a hydraulic excavator including a bucket 4 as an attachment to the tip of a work implement (front work implement) is illustrated as an example of a work machine to which the present invention is applied, there is no problem even if the present invention is applied to a hydraulic excavator including an attachment other than a bucket. In addition, the present invention can be applied also to a work machine other than a hydraulic excavator as long as the work machine has a work implement like a wheel loader, for example.

First Embodiment

Figure 1:
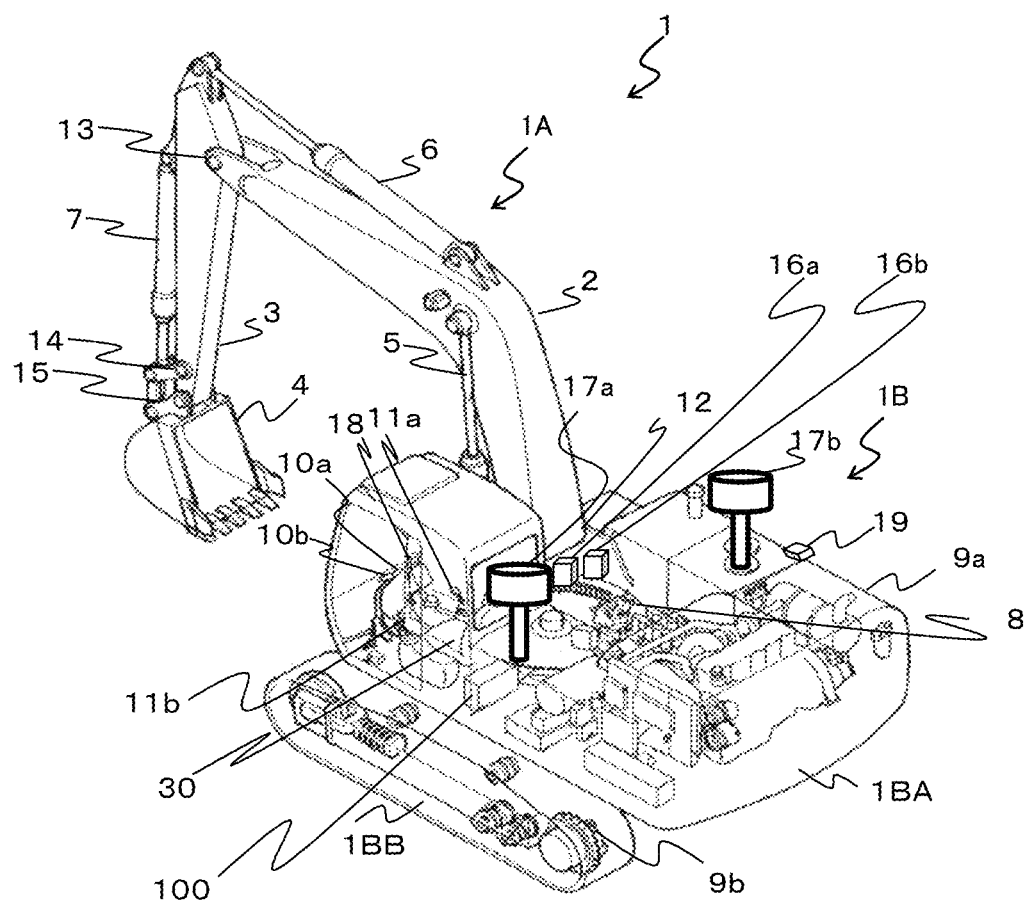
FIG. 1 is an external-appearance view of a hydraulic excavator according to an embodiment of the present invention.

FIG. 1 is a configuration diagram of the hydraulic excavator according to an embodiment of the present invention.

As illustrated in FIG. 1, a hydraulic excavator 1 includes: an articulated-type work implement (front work implement) 1A configured by coupling a plurality of front-implement members (a boom 2, an arm 3, and the bucket 4) that are pivoted in the vertical direction individually; and a machine body 1B including an upper swing structure 1BA and a lower track structure 1BB. The base end of the boom 2 positioned closer to the base end of the work implement 1A is supported at a front section of the upper swing structure 1BA so as to be pivotable in the upward/downward direction. The upper swing structure 1BA is attached swingably at an upper section of the lower track structure 1BB. In addition, an image-capturing device (camera) 19 and a controller 100 are installed on the upper swing structure 1BA. The image-capturing device 19 has known internal parameters for capturing photographs of reference points SP installed at a work site (e.g. the focal length (f), the image sensor size (h in the vertical direction, w in the horizontal direction), the number of pixels (H in the vertical direction, W in the horizontal direction), the unit cell size, the image center coordinates, and the like), and external parameters (the angles in the upward/downward direction, the leftward/rightward direction, and the rotation direction (i.e. the tilt angle (pitch angle), the pan angle (azimuth), and the roll angle). The controller 100 has a function of converting coordinates in a geographic coordinate system Co5 of a certain point into coordinates in a site coordinate system Co6 by using a coordinate conversion parameter Pr56 generated on the basis of coordinates in the geographic coordinate system Co5, and coordinates in the site coordinate system Co6 of the reference points SP installed at the work site. The site coordinate system Co6 is a three-dimensional coordinate system in which design data of a target of construction by the hydraulic excavator 1 is created.

The image-capturing device 19 is a monocular camera including an image-capturing element (image sensor) such as a CCD (Charge Coupled Device) or a CMOS (Complementary Metal Oxide Semiconductor). The image-capturing device 19 outputs data of captured images to the controller 100. In addition, other than a camera that can acquire only image information, a camera like a stereo camera that can acquire depth information (information about a distance to a subject) by using parallax, or a camera that can acquire depth information by emitting laser light or the like to measure the time taken for arrival of reflected light thereof or by other means may be used alternatively as the image-capturing device 19.

While the image-capturing device 19 is installed on the right side of the upper swing structure 1BA (the right side of the machine body) in the present embodiment, the installation position of the image-capturing device 19 may be the front side or rear side of the machine body, or the left side of the machine body, or image-capturing devices 19 may be installed at a plurality of portions. At that time, a plurality of image-capturing devices 19 may be installed at each location like stereo cameras. In addition, the image-capturing device 19 may have a function of making it easy to capture an image of a reference point mentioned below by using a mechanism (e.g. a platform) that can change the image-capturing direction as desired within a predetermined range, like changing the image-capturing direction to the direction of the reference point, for example. The position (the machine-body-coordinate-system coordinates), image-capturing direction, and internal parameters of the image-capturing device 19 in a machine-body coordinate system Co4 which is a three-dimensional coordinate system set for the upper swing structure 1BA are known or can be detected.

Since coordinate conversion parameters Pr14 and Pr41 for conversion between coordinates in an image-capturing-device coordinate system Co1 which is a three-dimensional coordinate system set for the image-capturing device 19, and coordinates in the machine-body coordinate system Co4 are known or can be detected, these can be converted to each other. An image captured by the image-capturing device 19 is output to the controller 100.

The boom 2, the arm 3, the bucket 4, the upper swing structure 1BA, and the lower track structure 1BB are included in driven members driven by a boom cylinder 5, an arm cylinder 6, a bucket cylinder 7, a swing hydraulic motor 8, and left and right travel hydraulic motors 9a and 9b (hydraulic actuators), respectively. Operation of the plurality of driven members is controlled by pilot pressures generated by a travel-right lever 10a, a travel-left lever 10b, an operation-right lever 11a, and an operation-left lever 11b (which are collectively referred to as operation levers 10 and 11 in some cases) being operated by an operator, which are installed in the cab on the upper swing structure 1BA. The pilot pressures output by the operation of the operation levers 10 and 11 are detected by a plurality of pressure sensors 45, and input to the controller 100 (see FIG. 2).

The pilot pressures to drive the plurality of driven members described above include not only pressures output by operation of the operation levers 10 and 11, but also pressures output by some (pressure-increasing valves) of a plurality of proportional solenoid valves 20 (see FIG. 2), which are mounted on the hydraulic excavator 1, being operated independently of operation of the operation levers 10 and 11, and pressures generated by reducing pilot pressures output by operation of the operation levers 10 and 11 due to some (pressure-reducing valves) of the plurality of proportional solenoid valves 20 being operated. In this manner, the pilot pressures output from the plurality of proportional solenoid valves 20 (pressure-increasing valves and pressure-reducing valves) trigger MC to operate the boom cylinder 5, the arm cylinder 6, and the bucket cylinder 7 according to a predetermined condition.

In the work implement 1A, a boom-angle sensor 12, an arm-angle sensor 13, and a bucket-angle sensor 14 are attached to a boom pin, an arm pin, and a bucket link 15, respectively, such that the pivoted angles $\alpha$, $\beta$, and $\gamma$ (see FIG. 3) of the boom 2, the arm 3, and the bucket 4 can be measured. A machine-body forward/backward-inclination-angle sensor 16a and a machine-body leftward/rightward-inclination-angle sensor 16b are attached to the upper swing structure 1BA. The machine-body forward/backward-inclination-angle sensor 16a detects a forward/backward-direction inclination angle $\theta$ (see FIG. 3) of the upper swing structure 1BA (machine body 1B) relative to a reference plane (e.g. a horizontal plane). The machine-body leftward/rightward-inclination-angle sensor 16b detects a leftward/rightward-direction inclination angle $\varphi$ (not illustrated) of the upper swing structure 1BA (machine body 1B) relative to the reference plane.

A first GNSS antenna 17a and a second GNSS antenna 17b are arranged on the upper swing structure 1BA. The first GNSS antenna 17a and the second GNSS antenna 17b are antennas for the RTK-GNSS (Real Time Kinematic-Global Navigation Satellite Systems), and receive radio waves (navigation signals) emitted from a plurality of GNSS satellites. The distances between the first GNSS antenna 17a and second GNSS antenna 17b, and the image-capturing device 19 are stored in a storage device of the controller 100. Accordingly, if the coordinates of the first GNSS antenna 17a or the second GNSS antenna 17b in the geographic coordinate system, and the inclination angles $\theta$ and $\varphi$ of the machine body are known, the coordinates of the image-capturing device 19 in the geographic coordinate system can be calculated.

Figure 3:
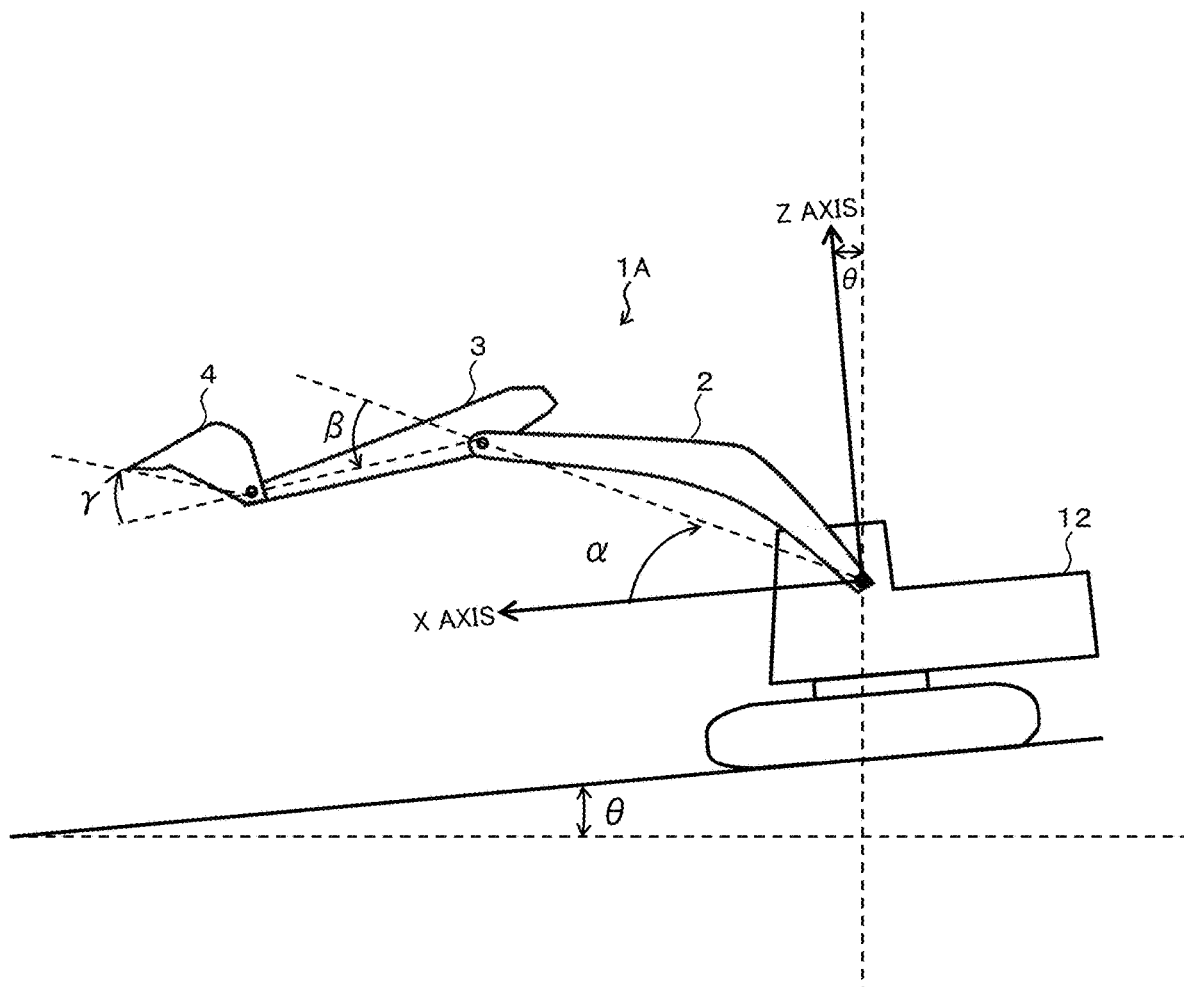
FIG. 3 is an explanatory diagram of a machine-body coordinate system Co4 set for the hydraulic excavator.

The X axis and the Z axis illustrated in FIG. 3 represent the machine-body coordinate system Co4 having its origin at a point (e.g. the middle point) on the shaft center of the boom pin, and having the Z axis along the machine-body upward direction, the X axis along the machine-body forward direction, and the Y axis along the machine-body rightward direction. The machine-body coordinate system Co4 and the geographic coordinate system Co5 can be converted to each other by using coordinate conversion parameters Pr45 and Pr54 obtained by a known method. For example, on the basis of the facts that the dimensions of each of the front-implement members 2, 3, and 4, and the coordinates of the first and second GNSS antennas 17a and 17b in the machine-body coordinate system Co4 are known, and that the pitch angle $\theta$ and the roll angle $\varphi$ of the machine body 1B can be acquired by using the sensors 16a and 16b, the coordinate conversion parameters Pr45 and Pr54 can be determined from the geographic-coordinate-system coordinates of the first GNSS antenna 17a and the second GNSS antenna 17b obtained by the RTK-GNSS positioning, and the azimuths of the upper swing structure 1BA and the front work implement 1A in the geographic coordinate system that are calculated from those geographic-coordinate-system coordinates.

On a screen of the display monitor 18 in the cab of the hydraulic excavator 1, an image of the work implement 1A as seen in a side view and a cross-sectional shape of a target surface are displayed on the basis of information about the posture of the work implement 1A calculated from outputs of various types of the posture sensors 12, 13, 14, and 16, information about the position of the upper swing structure 1BA calculated from reception signals of the GNSS antennas 17a and 17b, and the like.

Figure 2:
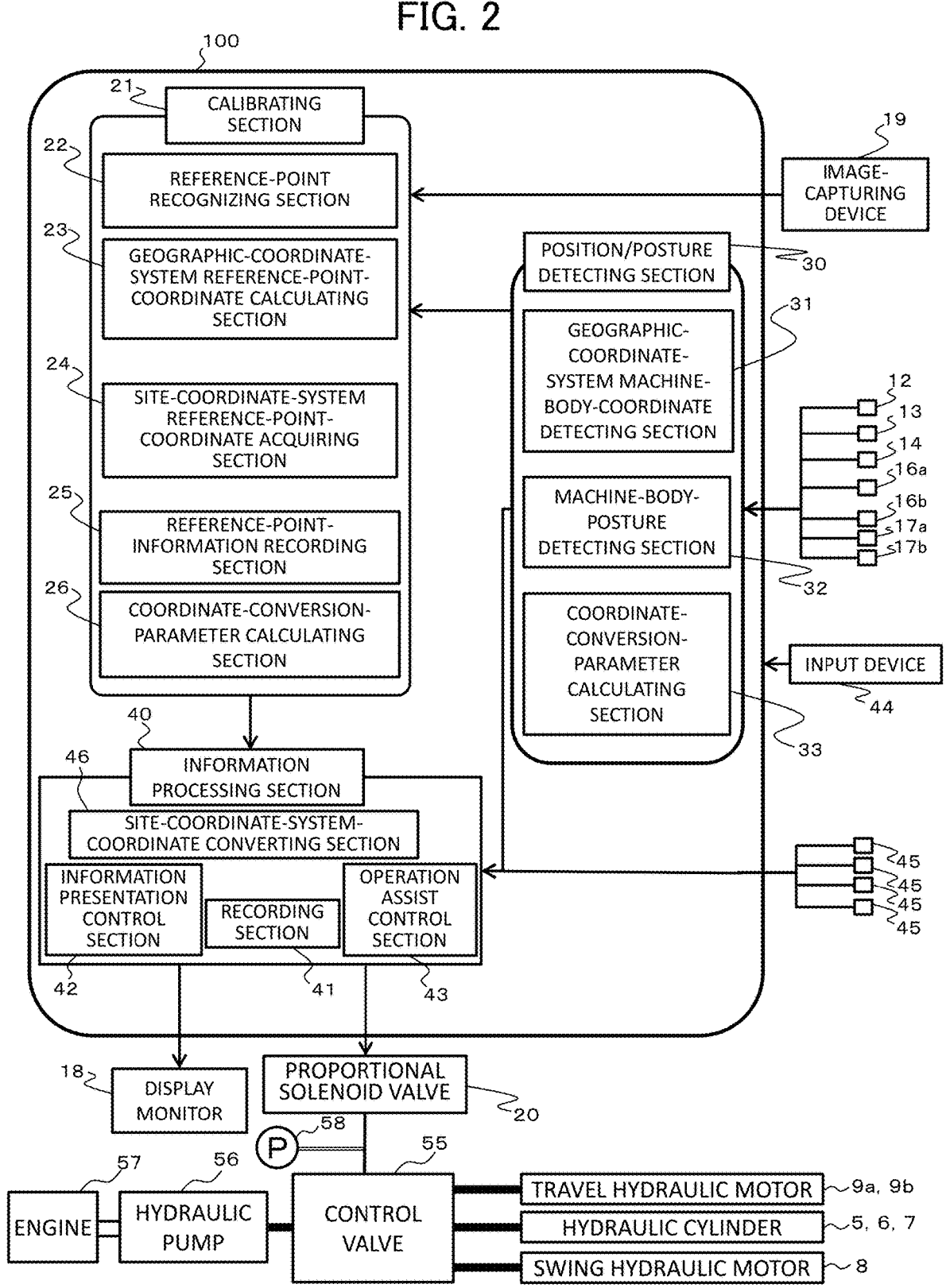
FIG. 2 is a configuration diagram of a coordinate conversion system and a hydraulic excavator control system according to the first embodiment of the present invention.

FIG. 2 is a system configuration diagram of the hydraulic excavator 1 according to the first embodiment. As illustrated in FIG. 2, the hydraulic excavator 1 according to the present embodiment includes: the image-capturing device 19; the posture sensors (angle sensors) 12, 13, and 14; the inclination angle sensors 16a and 16b; the first and second GNSS antennas 17a and 17b; the controller 100; and the display monitor 18.

The controller 100 is a controller having: a processing device (e.g. a CPU); and a storage device (e.g. a semiconductor memory such as a ROM or a RAM) storing a program to be executed by the processing device. The controller 100 according to the present embodiment receives information and signals from an external device (e.g. the image-capturing device 19, an input device 44 (see FIG. 9), various types of the sensors 12, 13, 14, 16, and 17, and the operation levers 10 and 11), to perform calculation of the coordinates of a control point on the work implement 1A in the geographic coordinate system Co5 or the site coordinate system Co6, and various types of calculation necessary for it, and various types of calculation related to display on the display monitor (display device) 18 installed in the cab of the hydraulic excavator 1 and operation of the hydraulic excavator 1. In the storage device (a ROM, a RAM, and the like), recording areas of a reference-point-information recording section 25 of a calibrating section 21, a recording section 41 of an information processing section 40 and the like are reserved. Specific contents of the calculation executed by the controller 100 are mentioned below by using a functional block diagram illustrated in FIG. 2.

In addition, in FIG. 2, the hydraulic excavator 1 according to the present embodiment includes: an engine 57; a hydraulic pump 56 and a pilot pump (not illustrated) that are mechanically coupled to an output shaft of the engine 57, and are driven by the engine 57; the operation levers 10 and 11 that output, to a control valve 55 via a proportional solenoid valve 20, a pressure (pilot pressure) that is generated by reducing the pressure of a hydraulic fluid delivered from the pilot pump according to an operation amount as a control signal for each of the hydraulic actuators 5 to 9; the plurality of pressure sensors 45 that detect pressure values of the pilot pressures output by the operation levers 10 and 11, and detect the operation amounts/operation directions of the operation levers 10 and 11; a plurality of control valves 55 that control the flow rate and direction of a hydraulic operating fluid introduced from the hydraulic pump 56 to each of the hydraulic actuators 5 to 9 on the basis of a control signal (pilot pressure) output from the operation lever 10 or 11 or a proportional solenoid valve 20; a plurality of pressure sensors 58 that detect the pressure value of a pilot pressure acting on each control valve 55; the controller 100 that computes a corrected target pilot pressure on the basis of the position/posture of the work implement 1A, and other machine-body information, and outputs a command voltage that can generate the corrected target pilot pressure to a proportional solenoid valve 20; and the input device 44 for inputting, to the controller 100, information about a target surface to be formed by the work implement 1A, site-coordinate-system coordinates of a reference point SP whose image is captured by the image-capturing device 19, and the like.

The hydraulic pump 56 is controlled mechanically in terms of its torque/flow rate such that the machine body operates according to a target output power of each of the hydraulic actuators 5 to 8.

The number of the control valves 55 is the same as the number of the control-target hydraulic actuators 5 to 8, but they are collectively illustrated as one control valve 55 in FIG. 2. Two pilot pressures act on each control valve to shift a spool therein in one direction or the other direction of the axial directions. For example, a boom-raising pilot pressure and a boom-lowering pilot pressure act on a control valve 55 for the boom cylinder 5.

The pressure sensors 58 detect pilot pressures acting on each control valve 55, and the number of the pressure sensors 58 can be twice the number of the control valves. The pressure sensors 58 are provided directly under the control valves 55, and detect pilot pressures actually acting on the control valves 55.

Although there are the plurality of proportional solenoid valves 20, they are collectively illustrated as one block in FIG. 2. There are two types of proportional solenoid valves 20. One of the types is pressure-reducing valves that directly output pilot pressures input from the operation levers 10 and 11 or reduce pilot pressures input from the operation levers 10 and 11 to desired corrected target pilot pressures designated by command voltages, and output the reduced pilot pressures. The other of the types is pressure-increasing valves that reduce pilot pressures input from pilot pumps to desired corrected target pilot pressures designated by command voltages when pilot pressures higher than pilot pressures output by the operation levers 10 and 11 are required, and output the reduced pilot pressures. When a pilot pressure higher than a pilot pressure being output from the operation lever 10 or 11 is required as a pilot pressure for a certain control valve 55, a pilot pressure is generated via a pressure-increasing valve. When a pilot pressure lower than a pilot pressure being output from the operation lever 10 or 11 is required as a pilot pressure for a control valve 55, a pilot pressure is generated via a pressure-reducing valve. When a pilot pressure is not being output from the operation levers 10 and 11, a pilot pressure is generated via a pressure-increasing valve. That is, pressure-reducing valves and pressure-increasing valves allow pilot pressures with pressure values different from pilot pressures input from the operation levers 10 and 11 (pilot pressures based on operator operation) to act on control valves 55, and this makes it possible to cause hydraulic actuators which are control targets of the control valves 55 to perform desired operation.

The maximum number of each of pressure-reducing valves and pressure-increasing valves that can be present per control valve 55 is two. For example, in the present embodiment, two pressure-reducing valves and two pressure-increasing valves are provided for the control valve 55 of the boom cylinder 5. Specifically, the hydraulic excavator 1 includes: a first pressure-reducing valve provided on a first line that introduces a boom-raising pilot pressure from the operation lever 11 to a control valve 55; a first pressure-increasing valve provided on a second line that introduces a boom-raising pilot pressure from the pilot pump to the control valve 55, bypassing the operation lever 11; a second pressure-reducing valve provided on a third line that introduces a boom-lowering pilot pressure from the operation lever 11 to the control valve 55; and a second pressure-increasing valve provided on a fourth line that introduces a boom-lowering pilot pressure from the pilot pump to the control valve 55, bypassing the operation lever 11.

In the present embodiment, there are no proportional solenoid valves 20 for control valves 55 of the travel hydraulic motors 9a and 9b and the swing hydraulic motor 8. Accordingly, the travel hydraulic motors 9a and 9b and the swing hydraulic motor 8 are driven on the basis of pilot pressures output from the operation levers 10 and 11.

<Configuration of Controller 100>

The controller 100 calculates the geographic-coordinate-system coordinates of the image-capturing device 19 on the basis of navigation signals received at the GNSS antennas 17a and 17b, calculates the geographic-coordinate-system coordinates of a reference point on the basis of the calculated geographic-coordinate-system coordinates of the image-capturing device 19, an image of the reference point captured by the image-capturing device 19, and internal parameters of the image-capturing device 19, and calibrates (calculates) mutual coordinate conversion parameters Pr56 and Pr65 of the geographic coordinate system and the site coordinate system on the basis of the calculated geographic-coordinate-system coordinates of the reference point, and the site-coordinate-system coordinates of the reference point. In FIG. 2, the controller 100 includes a position/posture detecting section 30, the calibrating section 21, and the information processing section 40. Hereinafter, details of the configuration of the controller 100 are explained.

The position/posture detecting section 30 includes: a geographic-coordinate-system machine-body-coordinate detecting section 31 that calculates the coordinates of the upper swing structure 1BA in the geographic coordinate system (the coordinates of the first GNSS antenna 17a and the second GNSS antenna 17b); a machine-body-posture detecting section 32 that calculates the postures of the front work implement 1A and the machine body 1B; and a coordinate-conversion-parameter calculating section 33 that calculates the coordinate conversion parameters Pr45 and Pr54 of the machine-body coordinate system Co4 and the geographic coordinate system Co5. In order to acquire the information in the present embodiment, the position/posture detecting section 30 is connected with the boom-angle sensor 12, the arm-angle sensor 13, the bucket-angle sensor 14, the machine-body forward/backward-inclination-angle sensor 16*a*, the machine-body leftward/rightward-inclination-angle sensor 16*b*, the first GNSS antenna 17*a*, and the second GNSS antenna 17*b*.

The geographic-coordinate-system machine-body-coordinate detecting section 31 measures the latitude, longitude, and height (ellipsoidal height) of the position of each antenna on the basis of lengths of time required for radio waves (navigation signals) emitted from a plurality of GNSS satellites to be received by the first and second GNSS antennas 17*a* and 17*b*. Thereby, the position and direction of the hydraulic excavator 1 (upper swing structure 1BA) in the geographic coordinate system (global coordinate system) Co5, which is a three-dimensional coordinate system, can be calculated. Furthermore, the geographic-coordinate-system machine-body-coordinate detecting section 31 calculates the coordinates of the image-capturing device 19 in the geographic coordinate system Co5 by using, in addition to the calculation result, the distance between the image-capturing device 19 and each of the first and second GNSS antennas 17*a* and 17*b* stored in the storage device of the controller 100. At that time, when that the machine body 1B is inclined, the inclination angles θ and φ are preferably taken into consideration. Note that the positions and heights of the first and second GNSS antennas 17*a* and 17*b* may be calculated by a dedicated receiver (GNSS receiver), and a result of the calculation may be output to the controller 100, in one possible configuration that may be adopted.

The machine-body-posture detecting section 32 calculates the posture of the front work implement 1A in the machine-body coordinate system Co4 by calculating the pivoted angles α, β, and γ of the boom 2, the arm 3, and the bucket 4 in the machine-body coordinate system Co4 from information of the boom-angle sensor 12, the arm-angle sensor 13, and the bucket-angle sensor 14, and the machine-body-posture detecting section 32 calculates the posture of the machine body in the geographic coordinate system Co5 by calculating the forward/backward-direction inclination angle θ (see FIG. 3) and the leftward/rightward-direction inclination angle φ in the geographic coordinate system Co5 from information from the machine-body forward/backward-inclination-angle sensor 16*a* and the machine-body leftward/rightward-inclination-angle sensor 16*b*. Since coordinates in the machine-body coordinate system Co4 and the geographic coordinate system Co5 can be converted to each other, if the posture of the front work implement 1A in the machine-body coordinate system can be identified, the geographic-coordinate-system coordinates of a certain control point (e.g. the bucket claw tip) set for the front work implement 1A also can be calculated. Note that the direction of the hydraulic excavator 1 (upper swing structure 1BA) calculated at the geographic-coordinate-system machine-body-coordinate detecting section 31 coincides with the X axis of the machine-body coordinate system Co4.

The coordinate-conversion-parameter calculating section 33 calculates the mutual coordinate conversion parameters Pr45 and Pr54 of the machine-body coordinate system Co4 and the geographic coordinate system Co5 on the basis of information about the positions and postures calculated at the position/posture detecting section 30 and the geographic-coordinate-system machine-body-coordinate detecting section 31, and outputs the mutual coordinate conversion parameters Pr45 and Pr54 to the controller 100 installed in the cabin of the machine body 1B.

The calibrating section 21 calculates the geographic-coordinate-system coordinates of a reference point from an image captured by the image-capturing device 19, and information output by the position/posture detecting section 30, and calculates (calibrates) the coordinate conversion parameters Pr56 and Pr65 on the basis of results of the calculation, and the site-coordinate-system coordinates of the reference point.

The calibrating section 21 includes a reference-point recognizing section 22, a geographic-coordinate-system reference-point-coordinate calculating section 23, a site-coordinate-system reference-point-coordinate acquiring section 24, the reference-point-information recording section 25, and a coordinate-conversion-parameter calculating section 26. The calibrating section 21 receives, as inputs, the image captured by the image-capturing device 19, the coordinate conversion parameters Pr45 and Pr54 of the machine-body coordinate system Co4 and the geographic coordinate system Co5 output by the position/posture detecting section 30, and information about the coordinates in the site coordinate system Co6 of the reference point output from the input device 44, and outputs a coordinate conversion parameter for converting coordinates in the geographic coordinate system Co5 into coordinates in the site coordinate system Co6.

The reference-point recognizing section 22 decides whether or not a reference point SP of a work site is captured in an image captured by the image-capturing device 19 by using an image processing technology such as pattern matching.

Figure 4:
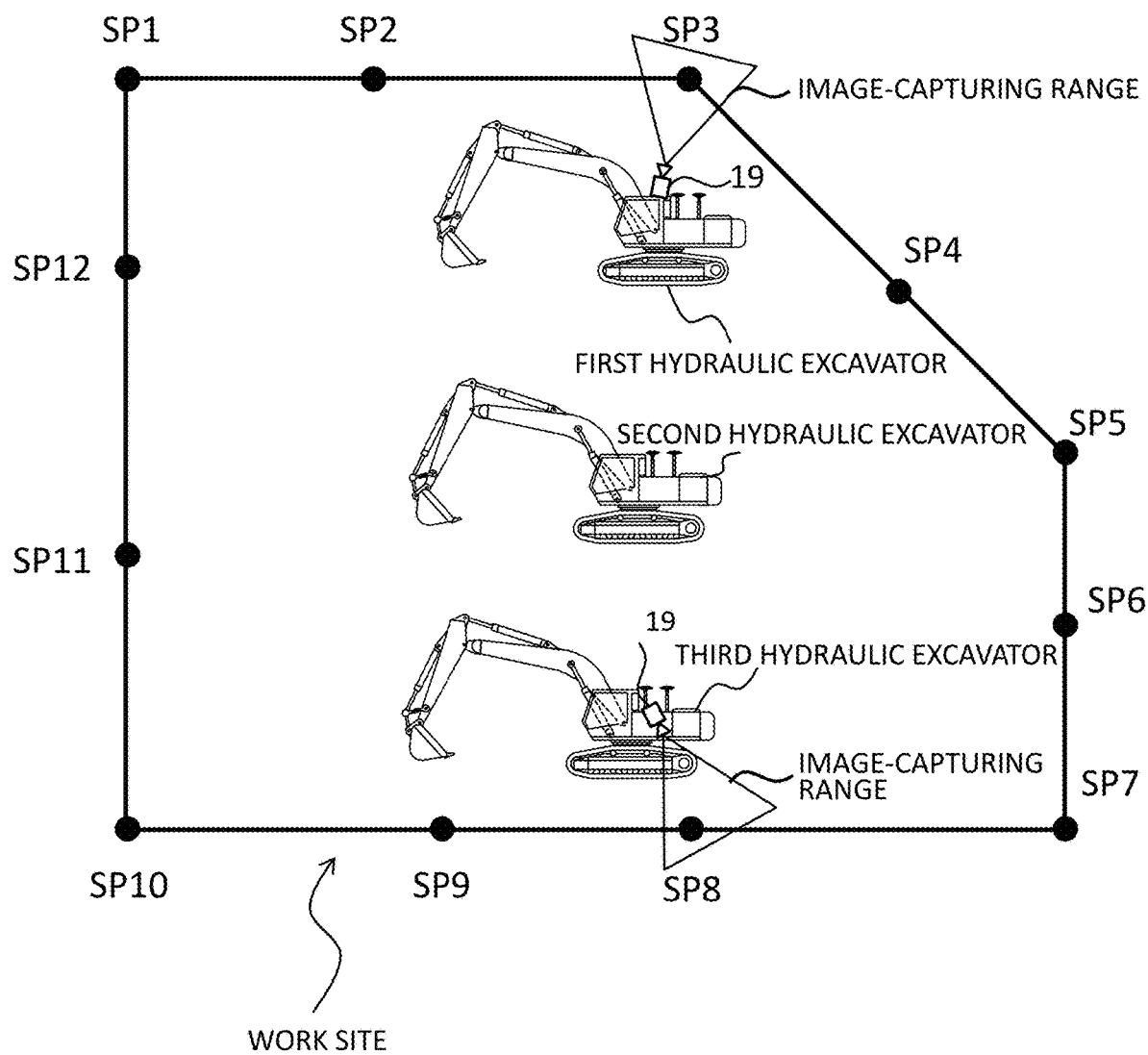
FIG. 4 is an explanatory diagram of a plurality of reference points set for a work site.

A reference point SP is a point whose coordinates in the site coordinate system Co6 are known, and is written on a certain object installed fixedly at a predetermined position in the work site. Typically, a plurality of reference points SP1 to SP12 are installed such that they surround the work site as illustrated in FIG. 4. The reference points (SPn) may be attached to the ground or wall surfaces. In addition, objects that are installed as the reference points SPn are objects having features of a predetermined size, color, pattern, shape or property, and include stakes, nails, markers, and the like. In addition, markers mentioned here may be markers that reflect light having a particular wavelength, markers that reflect light in a particular direction, AR markers used in an AR (Augmented Reality) technology, and markers that include two-dimensional codes such as QR codes (registered trademark).

Figure 5:
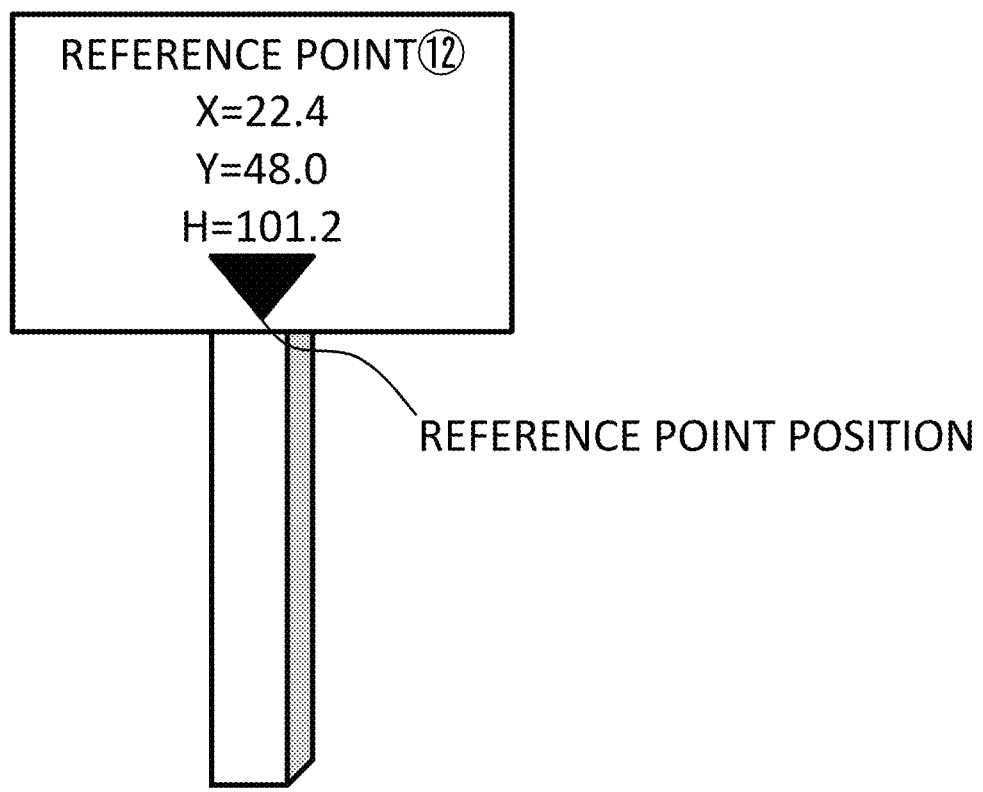
FIG. 5 is a figure illustrating one example of a reference-point display tool indicating the position of a reference point, identification information, and site-coordinate-system coordinates.

FIG. 5 illustrates one example of a reference-point display tool on which a reference point SPn is indicated. The reference-point display tool in FIG. 5 includes a stake pushed into the ground and a board attached onto the stake. On the surface of the board, identification information (12) of a reference point SP12, the coordinates of the reference point SP12 in the site coordinate system Co6 (X=22.4, Y=48.0, H=101.2), and a triangular marker indicating the position of the reference point SP12 are written. The lower end of the triangular marker in FIG. 5 is the position of the reference point SP12. It is considered that a reference-point display tool like the one in FIG. 5 is provided at each of the reference points SP1 to SP12 in FIG. 4. The identification information and site-coordinate-system coordinates of a reference point SP may be embedded in the marker. Note that the site-coordinate-system reference-point-coordinate acquiring section 24 mentioned below reads out, from an image captured by the image-capturing device 19, the reference point name and the site-coordinate-system coordinates of the reference point written on the board of the reference-point display tool.

The reference-point recognizing section 22 according to the present embodiment decides whether a reference point SP is captured in an image captured by the image-capturing device 19, by using the triangular marker of the reference-point display tool illustrated in FIG. 5. Specifically, the reference-point recognizing section 22 detects an area (a triangular area) capturing a triangular marker in a captured image by using an image processing program such as a program for edge detection, and performs pattern matching between the shape of the detected triangular area, and the shape of a triangular marker (template pattern) prestored in the storage device in the controller 100. Then, the reference-point recognizing section 22 decides that the triangular area detected in the captured image corresponds to the triangular marker, and that a reference point SP is captured in the image captured by the image-capturing device 19 when the matching rate of them exceeds a predetermined threshold value.

The geographic-coordinate-system reference-point-coordinate calculating section 23 calculates the distance and direction from the image-capturing device 19 to the reference point SP recognized by the reference-point recognizing section 22 by performing image processing on the image of the reference point SP captured by the image-capturing device 19, and calculates the coordinates, in the geographic coordinate system Co5, of the reference point SP recognized by the reference-point recognizing section 22 on the basis of the distance and direction, and the geographic-coordinate-system coordinates of the image-capturing device 19 calculated by the geographic-coordinate-system machine-body-coordinate detecting section 31.

First, in the present embodiment, the geographic-coordinate-system reference-point-coordinate calculating section 23 senses the size and a distortion of the triangular area recognized by the reference-point recognizing section 22, and compares them with the shape and size of the prestored triangular marker (template pattern), to thereby calculate the relative positions of the image-capturing device 19 and the reference point SP. Estimation of the distance and direction by using a marker whose size is known can be realized by known methods. For example, a marker area (triangular area) is extracted by extracting the vertices of a triangle surrounded by three edges from a captured image by using extraction of contour lines by image processing. The extracted area is normalized, and a position that gives the maximum value of the similarity with the template pattern as a result of pattern matching is treated as the position of the marker (i.e. the reference point SP). Since the coordinates (position) of the image-capturing device 19 in the machine-body coordinate system Co4 are known, it is possible to calculate the coordinates of the reference point SP in the machine-body coordinate system Co4 from the thus-determined relative positions of the image-capturing device 19 and the reference point SP, that is, the distance and direction (the roll angle, the pitch angle, and the azimuth) between the image-capturing device 19 and the reference point SP.

Next, the geographic-coordinate-system reference-point-coordinate calculating section 23 converts the coordinates of the reference point SP in the machine-body coordinate system Co4 into coordinates in the geographic coordinate system Co5. This coordinate conversion can be performed by multiplying the coordinates of the reference point SP in the machine-body coordinate system Co4 by a matrix Mt45 (i.e. the coordinate conversion parameter Pr45). This matrix Mt45 can be calculated by known methods, and for example, can be a rotation matrix that rotates the coordinates on the basis of the roll angle, the pitch angle, and the azimuth. The computed coordinates of the reference point SP in the geographic coordinate system Co5 are output to the reference-point-information recording section 25.

In addition, while the distance and direction between the image-capturing device 19 and the reference point SP are calculated by pattern matching in the present embodiment, there is no problem even if any other method is used as along as the method can determine the distance and direction of the reference point SP from an image captured by the image-capturing device 19 by using image processing. For example, as the image-capturing device 19, for example, a stereo camera that generates a parallax image from images captured by a plurality of cameras whose distances to each other are known, and can calculate the distance to the reference point SP may be used.

The site-coordinate-system reference-point-coordinate acquiring section 24 is a section that executes a process of acquiring coordinates, in the site coordinate system Co6, of the reference point SP whose coordinates in the geographic coordinate system Co5 are calculated by the geographic-coordinate-system reference-point-coordinate calculating section 23. There are a plurality of patterns in terms of the method of acquiring the coordinates of the reference point SP in the site coordinate system Co6. For example, the site-coordinate-system reference-point-coordinate acquiring section 24 can acquire information about the site-coordinate-system coordinates of the reference point SP included in an image captured by the image-capturing device 19 by reading out the information by image recognition. Specifically, when a reference-point display tool displays actual numerical values as the reference-point display tool in FIG. 5 does, the numerical values may be read out by using image recognition. When a reference-point display tool displays a two-dimensional code or a marker having embedded information about the site-coordinate-system coordinates of the reference point, the two-dimensional code or the marker may be searched for on an image captured by the image-capturing device 19, and the embedded site-coordinate-system coordinates may be read in. When a reference-point display tool displays identification information on the reference point SP as the reference-point display tool in FIG. 5 does, the identification information may be read out from an image, and the site-coordinate-system coordinates of the reference point SP corresponding to the identification information may be read in from the reference-point-information recording section 25. In addition, for example, a message prompting an operator to input the site-coordinate-system coordinates of a reference point may be displayed on the display monitor 18, and the operator may be caused to input the site-coordinate-system coordinates via the input device 44. Note that examples of identification information on a reference point include an ID, a name, and site-coordinate-system coordinates set uniquely for the reference point.

The reference-point-information recording section 25 is a section that records reference point information. The reference point information includes the geographic-coordinate-system coordinates of a reference point calculated by the geographic-coordinate-system reference-point-coordinate calculating section 23, and the site-coordinate-system coordinates of the reference point acquired by the site-coordinate-system reference-point-coordinate acquiring section 24, and may include identification information (an ID or a name) allocated uniquely to each reference point. By using, as an input, the coordinates of a reference point in the geographic coordinate system Co4 calculated at the geographic-coordinate-system reference-point-coordinate calculating section 23, reference point information is recorded, and is output to the site-coordinate-system reference-point-coordinate acquiring section 24 and the coordinate-conversion-parameter calculating section 26. In the initial state, reference point information used for coordinate-conversion-parameter calculation in the initial state is recorded in the reference-point-information recording section 25 on the basis of an input from the input device 44. In addition, when reference points are increased or reduced in the middle of construction, information about corresponding reference points are add to or removed by using the input device 44.

The coordinate-conversion-parameter calculating section 26 calculates (calibrates) the mutual coordinate conversion parameters Pr56 and Pr65 of the geographic coordinate system Co5 and the site coordinate system Co6 by using the geographic-coordinate-system coordinates and the site-coordinate-system coordinates of a plurality of reference points recorded in the reference-point-information recording section 25. The coordinate conversion parameters Pr56 and Pr65 can be calculated by known methods, and, for example, are a conversion matrix including at least one of a translation matrix, a rotation matrix, and a scaling matrix. Explaining simply about the computation of the coordinate conversion parameter P56, for example, the geographic-coordinate-system coordinates of a reference point are converted into coordinates Bk in a three-dimensional orthogonal coordinate system whose parameter for coordinate conversion from the geographic coordinate system is known (e.g. the plane rectangular coordinate system or geocentric orthogonal coordinate system in Japan). If the coordinates obtained after the conversion are expressed as Bk (Xk, Yk, Zk), and the site-coordinate-system coordinates of the reference point are expressed as Pk (xk, yk, zk), Bk can be expressed by Pk as in the following formula. It should be noted however that, in the following formula, Poffset represents a translation matrix, R represents a rotation matrix, S represents a scaling matrix, and $\delta k$ represents an error. These are coordinate conversion parameters.

$$Bk = \text{Poffset} + R \cdot Pk + S \cdot Pk + \delta k$$

Then, regarding n reference points (n is a number equal to or larger than two) whose geographic-coordinate-system coordinates and site-coordinate-system coordinates are recorded in the reference-point-information recording section 25, the coordinate conversion parameters that minimize the sum of $\delta k^2$ are determined by the least-squares method. Then, the coordinate conversion parameter Pr56 can be calculated from the calculated coordinate conversion parameters, and the coordinate conversion parameters used initially in the conversion into the coordinates Bk. Note that reference point information about the plurality of reference points recorded in the reference-point-information recording section 25 is used for the calculation of the coordinate conversion parameters Pr56 and Pr65, but not the entire reference point information may be used.

The coordinate conversion parameters Pr56 and 65 calculated by the coordinate-conversion-parameter calculating section 26 are output to the information processing section 40.

The information processing section 40 converts, on the basis of the coordinate conversion parameter Pr56 output by the calibrating section 21, machine-body positional information in the geographic coordinate system output from the position/posture detecting section 30 into site-coordinate-system coordinates, and calculates information to be presented to an operator and control information for operation assist, according to the machine body postural information and the machine-body site-coordinate-system coordinates, computerized construction data input from the input device 44, and operation input information (detection values of the pressure sensors 45) input from the operation levers 10 and 11. The information to be presented to the operator is output to the display monitor 18, the control information for operation assist is output to the proportional solenoid valve 20, to thereby realize an information presentation function or an operation assist function.

The information processing section 40 includes the recording section 41, a site-coordinate-system-coordinate converting section 46, an information presentation control section 42, and an operation assist control section 43. The information processing section 40 receives inputs of information from the calibrating section 21, the position/posture detecting section 30, the input device 44, and the pressure sensor 45, and outputs the information to the display monitor 18 and the proportional solenoid valve 20.

The recording section 41 records the coordinate conversion parameter Pr56 input from the calibrating section 21, and the computerized construction data input from the input device 44. Every time the coordinate conversion parameter Pr56 is calibrated by the calibrating section 21, it is recorded in the recording section 41, and is used for control executed by the information presentation control section 42 and the operation assist control section 43. Note that the computerized construction data is data having three-dimensional information for providing the information presentation function by the information presentation control section 42, and the operation assist function by the operation assist control section 43, and, for example, includes data about the shape of a target surface constructed with the hydraulic excavator 1 (target-surface data), and data about areas where the work machine is prohibited from entering. Any of the pieces of the computerized construction data is used for controlling the hydraulic cylinders 5, 6, and 7 such that the intrusion of the front work implement 1A is prevented.

The site-coordinate-system-coordinate converting section 46 converts machine-body positional information in the geographic coordinate system Co5 input from the position/posture detecting section 30 into machine-body positional information in the site coordinate system Po6 on the basis of the coordinate conversion parameter Pr56 recorded in the recording section 41. The machine-body positional information input from the position/posture detecting section 30 includes, for example, the geographic-coordinate-system coordinates of a control point (e.g. the bucket claw tip) set for the front work implement 1A on the basis of the geographic-coordinate-system coordinates of the swing structure 1BA, and information about the postures of the front work implement 1A and the machine body 1B detected by the posture sensors 12 to 14 and 16. In addition, the machine-body positional information also includes the geographic-coordinate-system coordinates of a control point (e.g. the rear end of the upper swing structure 1BA) set for the machine body 1B on the basis of the direction of the swing structure 1BA in the geographic coordinate system, and the information about the posture of the machine body 1B detected by the posture sensor 16.

The information presentation control section 42 calculates, on the basis of the information about the positions of the control points converted into site-coordinate-system coordinates by the site-coordinate-system-coordinate converting section 46 and the computerized construction data, the information that should be presented to the operator, and outputs the display information to the display monitor 18. The display information may include: a side view image of the front work implement 1A; a cross-sectional view (target surface) of target-surface shape data on the X-Z plane; various types of sensor value detected at the position/posture detecting section 30; the distance from the claw tip (control point) of the bucket 4 to a target surface; and the like.

The operation assist control section 43 calculates, on the basis of the information about the position of the control point converted into site-coordinate-system coordinates by the site-coordinate-system-coordinate converting section 46 and the computerized construction data, control signals for operating the hydraulic cylinders 5, 6, and 7, and outputs the control signals to the proportional solenoid valves 20 such that the operation by the operator is assisted. For example, the control signals limit the motion of the hydraulic cylinders 5, 6, and 7 such that a control point (e.g. the bucket claw tip) of the front work implement 1A does not crawl into a target surface, or control the motion of the hydraulic cylinders 5, 6, and 7, the travel hydraulic motors 9a and 9b, and the swing hydraulic motor 8 such that a control point of the machine body including the front work implement 1A is stopped before an obstacle or avoids the obstacle so as not to collide with the obstacle.

<Processing Flow by Controller>Next, the flow of processes performed by the controller 100 (calibrating section 21) to calibrate the coordinate conversion parameter Pr56 is explained with reference to FIG. 6. Note that the controller 100 (calibrating section 21) executes this coordinate conversion parameter calibration process repeatedly in a predetermined cycle (e.g. at intervals of several minutes).

Figure 6:
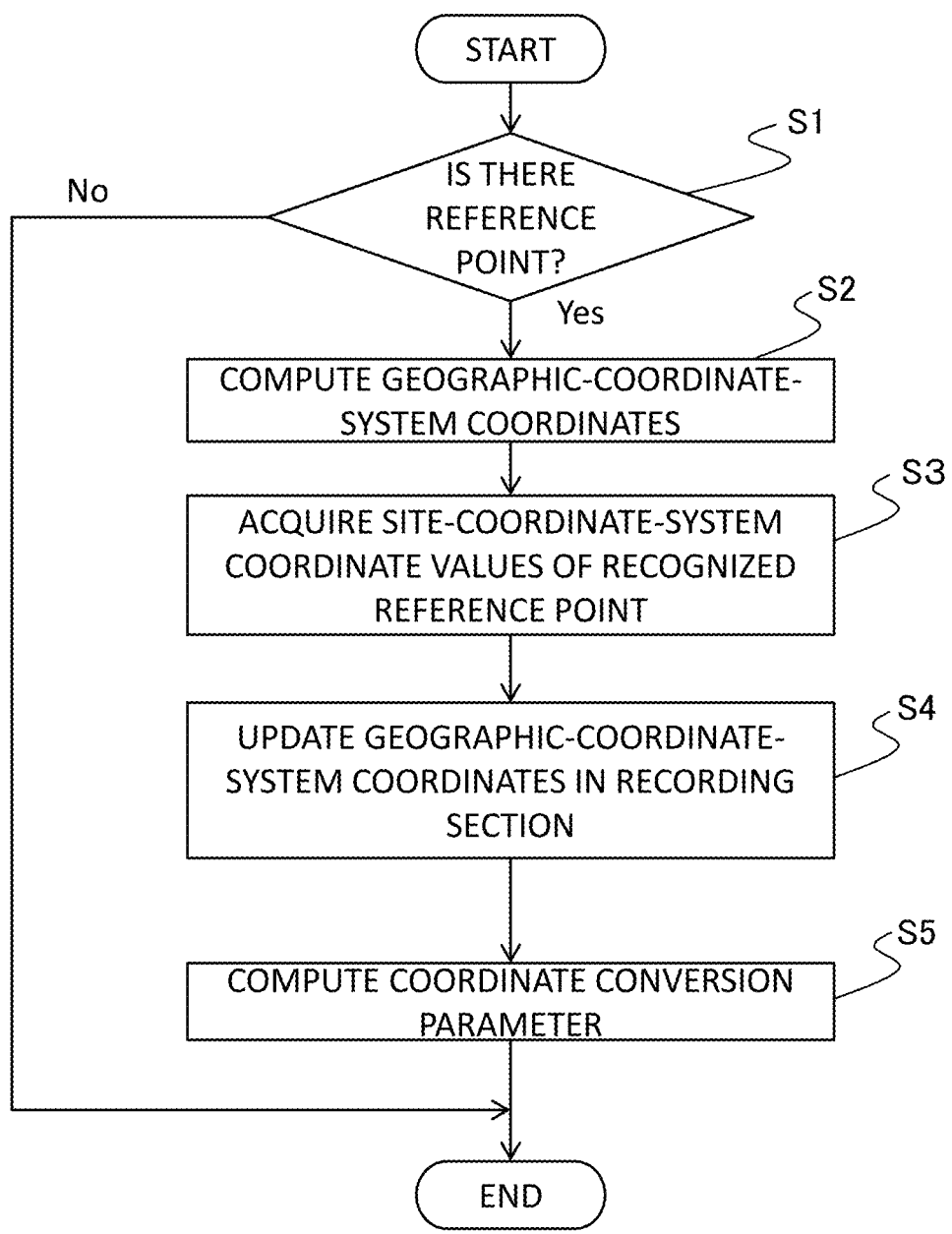
FIG. 6 is a flow diagram of a process executed by a controller in the first embodiment of the present invention.

When the process in FIG. 6 is started, at Step S1, first, the controller 100 (reference-point recognizing section 22) uses image recognition on an image captured by the image-capturing device 19, to decide whether or not there is a reference point in the image. When there is not a reference point in the image captured by the image-capturing device 19, the process is ended, and when there is a reference point, the process proceeds to the next Step S2.

At Step S2, the controller 100 (geographic-coordinate-system reference-point-coordinate calculating section 23) calculates, on the basis of information input from the image-capturing device 19 and the position/posture detecting section 30, the coordinates of the reference point in the geographic coordinate system Co5 at an image-capturing time of the image used at Step S1, and proceeds to Step S3.

At Step S3, the controller 100 (site-coordinate-system reference-point-coordinate acquiring section 24) acquires site-coordinate-system coordinates of the reference point whose coordinates in the geographic coordinate system Co5 are calculated at Step S2, and proceeds to Step S4. At Step S3, specifically, the site-coordinate-system coordinates are acquired by a method in which an operator uses the input device 44 to directly input the site-coordinate-system coordinates, a method of acquiring the site-coordinate-system coordinates of a reference point having geographic-coordinate-system coordinates within a predetermined range from the geographic-coordinate-system coordinates calculated at S2 from reference points recorded in the reference-point-information recording section 25, a method of reading out information from an image of the reference point whose image is captured by the image-capturing device 19 and acquiring the site-coordinate-system coordinate, or the like.

At Step S4, the controller 100 (calibrating section 21) updates, in the reference-point-information recording section 25, the correspondence between the geographic-coordinate-system coordinates of the reference point calculated at Step S2, and the site-coordinate-system coordinates of the reference point acquired at Step S3, and proceeds to Step S5.

At Step S5, the controller 100 (coordinate-conversion-parameter calculating section 26) calculates, on the basis of the geographic-coordinate-system coordinates and site-coordinate-system coordinates of the reference points recorded in the reference-point-information recording section 25, the coordinate conversion parameter Pr56 (e.g. Poffset (a translation matrix), R (a rotation matrix), S (a scaling matrix), and δk (an error) which are described above), and the coordinate conversion parameter Pr65 of the geographic coordinate system and the site coordinate system, records them in the recording section 41 of the information processing section 40, and ends the process.

<Action/Advantages>

A system including the controller 100, the image-capturing device 19, and the GNSS antennas 17a and 17b as described above can acquire the geographic-coordinate-system coordinates of a reference point SPn by capturing an image of the reference point SPn by the image-capturing device 19, and can easily acquire the geographic-coordinate-system coordinates of the reference point SPn in the latest condition even if variations occur in positioning results (geographic-coordinate-system coordinates) of GNSS due to the arrangement of satellites, the condition of the ionosphere, and the like. Thereby, the latest geographic-coordinate-system coordinates can be used to promptly calibrate the coordinate conversion parameter Pr56 for conversion from coordinates in the geographic coordinate system Co5 to coordinates in the site coordinate system Co6, and thus, by using the calibrated coordinate conversion parameter Pr56 for the control at the hydraulic excavator 1, the precision of calculation of control points of the hydraulic excavator 1, and the precision of construction by the hydraulic excavator 1 can be improved.

In addition, in the system described above, by displaying, on a reference-point display tool, a marker having embedded information about the site-coordinate-system coordinates of a reference point, capturing an image of the marker along with the reference point SPn by the image-capturing device 19, and restoring the information by image processing, it is possible to easily acquire not only the geographic-coordinate-system coordinates of the reference point SPn, but also the site-coordinate-system coordinates by image-capturing by the image-capturing device 19. Thereby, the coordinate conversion parameter Pr56 can be calculated more promptly.

In addition, by adopting a configuration in which the controller 100 controls the direction of the image-capturing device 19 such that the image-capturing range of the image-capturing device 19 always includes a reference point, a reference point is included in the image-capturing range of the image-capturing device 19 no matter when the image-capturing device 19 captures an image. Because of this, it becomes easier to calculate the coordinate conversion parameter Pr56 at a desired timing.

In addition, since the system including the controller 100, the image-capturing device 19, and the GNSS antennas 17a and 17b is mounted on the hydraulic excavator 1 in the embodiment described above, the calibrated coordinate conversion parameter Pr56 can be output to the controller of hydraulic excavator 1 promptly, and control using the coordinate conversion parameter Pr56 can be implemented without delay. Thereby, the information presentation control section 42 can cause the positional relation between the control point (bucket claw tip) of the front work implement 1A and a target surface to be displayed accurately on the display monitor 18, and additionally the precision of the control of the hydraulic actuators 5, 6, 7, 8, and 9 by the operation assist control section 43 can be improved.

Second Embodiment

Figure 7:
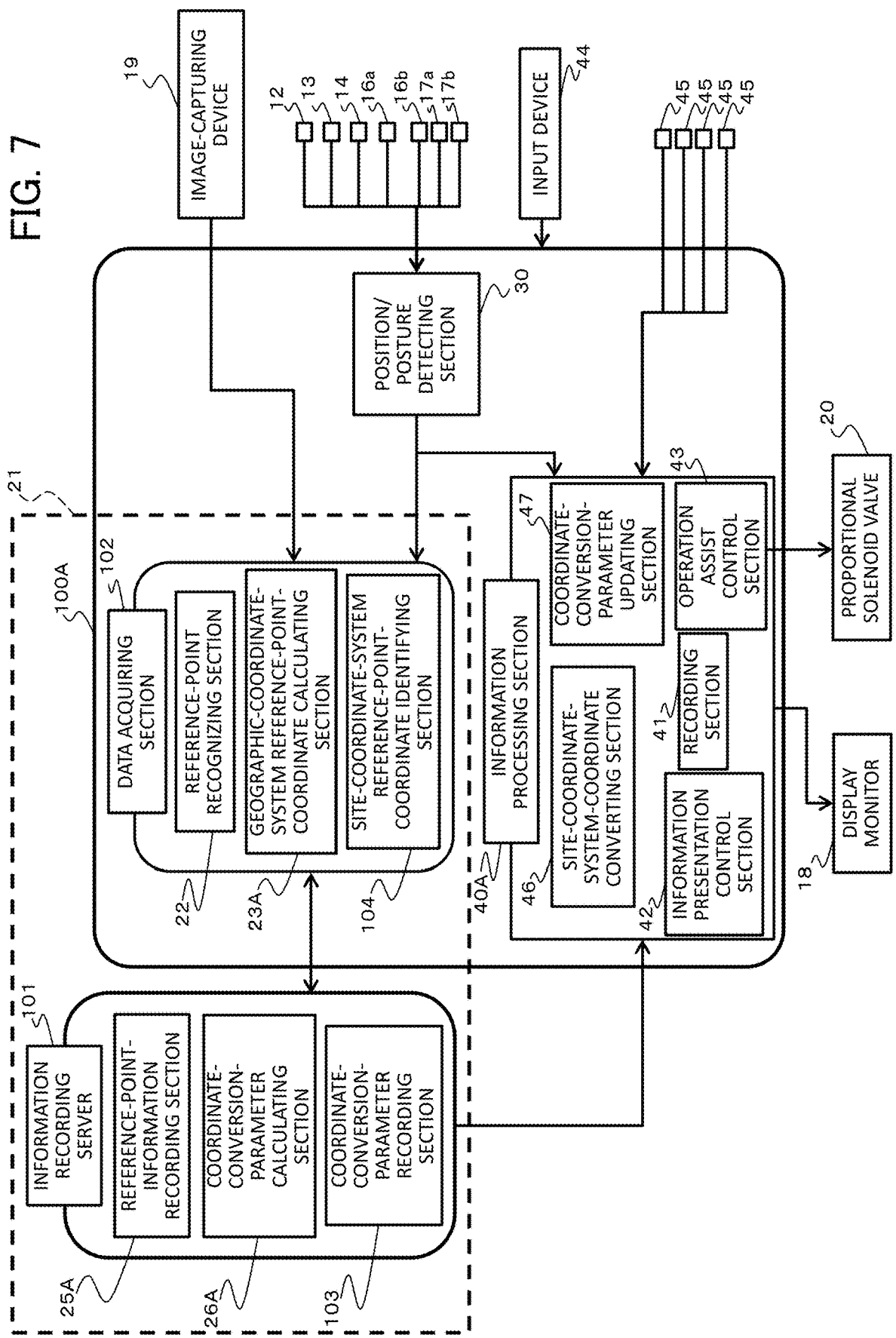
FIG. 7 is a configuration diagram of the coordinate conversion system and the hydraulic excavator control system according to a second embodiment of the present invention.

A system according to the present embodiment is illustrated in FIG. 7. Major differences between the present embodiment and the first embodiment include that an information recording server 101 is added, that a site-coordinate-system reference-point-coordinate identifying section 104 and a coordinate-conversion-parameter updating section 47 are added in the controller 100 (100A), and that the reference-point-information recording section 25 (25A) and the coordinate-conversion-parameter calculating section 26 (26A), which are in the controller 100 in the first embodiment, are shifted to the information recording server 101.

Note that sections that are the same as in the first embodiment are given the same reference characters, and explanations thereof are omitted as appropriate in some cases. Sections whose reference characters are given "A" as suffixes are configured to execute processes that are different from those in the first embodiment. Illustrations of the engine 57, the hydraulic pump 56, the control valves 55, the pressure sensors 58, and the actuators 5, 6, 7, 8 and 9 illustrated in FIG. 2 are omitted.

The system according to the present embodiment includes the image-capturing device 19, the controller 100A, the information recording server 101, the input device 44, the pressure sensor 45, the proportional solenoid valve 20, and the display monitor 18 as illustrated in FIG. 7. All of them except for the information recording server 101, that is, the image-capturing device 19, the controller 100A, the input device 44, the pressure sensor 45, the proportional solenoid valve 20, and the display monitor 18 are mounted on the hydraulic excavator 1.

<Controller (No. 1)>

The controller 100A includes a data acquiring section 102, an information processing section 40A, and the position/posture detecting section 30.

The data acquiring section 102 includes the reference-point recognizing section 22, a geographic-coordinate-system reference-point-coordinate calculating section 23A, and a site-coordinate-system reference-point-coordinate identifying section 104.

The geographic-coordinate-system reference-point-coordinate calculating section 23A calculates the coordinates in the geographic coordinate system Co5 of a reference point SP recognized by the reference-point recognizing section 22, and outputs a result of the calculation to the information recording server 101.

The site-coordinate-system reference-point-coordinate identifying section 104 acquires identification information (reference-point identification information) of the reference point SP whose coordinates in the geographic coordinate system Co5 are calculated by the geographic-coordinate-system reference-point-coordinate calculating section 23A, and outputs the acquired identification information to the information recording server 101. There are a plurality of patterns in terms of the method of acquiring the reference-point identification information. For example, the site-coordinate-system reference-point-coordinate identifying section 104 can acquire the reference-point identification information included in an image captured by the image-capturing device 19 by reading out the reference-point identification information by image recognition. Specifically, when a reference-point display tool displays reference-point identification information (12) as the reference-point display tool in FIG. 5 does, it may be read out from an image, and the identification information may be output. In addition, when the shape and pattern of a reference point are given reference-point identification information as a case where a marker including a two-dimensional code is used as a reference point or in other cases, image recognition may be used to recognize the information from an image captured by the image-capturing device 19. In addition, for example, a message prompting an operator to input the reference-point identification information may be displayed on the display monitor 18, and the operator may be caused to input the reference-point identification information via the input device 44. The reference-point identification information include an ID, a name, and a site-coordinate-system coordinate set uniquely for the reference point. When a reference-point display tool is given site-coordinate-system coordinate information as the reference-point display tool in FIG. 5 is, reference-point identification information on a reference point with matching site-coordinate-system coordinates may be acquired from reference point information recorded in the reference-point-information recording section 25.

<Information Recording Server>

The information recording server 101 is installed in a building of a management center that manages a plurality of hydraulic excavators 1 that are active in a certain work site, for example, and is connected mutually communicatively with controllers 100A of the plurality of hydraulic excavators 1 via a wireless communication network. The information recording server 101 is a computer having: a processing device (e.g. a CPU); and a storage device (e.g. a semiconductor memory such as a ROM or a RAM) storing a program to be executed by the processing device. In the storage device (a ROM, a RAM, and the like) in the information recording server 101, recording areas of the reference-point-information recording section 25A, a coordinate-conversion-parameter recording section 103, and the like are reserved. The information recording server 101 includes the reference-point-information recording section 25A, the coordinate-conversion-parameter calculating section 26, and the coordinate-conversion-parameter recording section 103. Note that, in the present embodiment, the data acquiring section 102 and the information recording server 101 in the controller 100A function as a calibrating section (the calibrating section 21 in the first embodiment) that calculates the coordinate conversion parameter Pr56 for converting coordinates in the geographic coordinate system into coordinates in the site coordinate system.

The reference-point-information recording section 25A records therein, as one set of reference point information, coordinates of a reference point in the geographic coordinate system Co5 calculated at the geographic-coordinate-system reference-point-coordinate calculating section 23A, and reference-point identification information acquired at the site-coordinate-system reference-point-coordinate identifying section 104. Coordinates in the site coordinate system Co6, and reference-point identification information on each reference point are recorded in the reference-point-information recording section 25A, and by using reference-point identification information input from the site-coordinate-system reference-point-coordinate identifying section 104 as a key, the coordinates of the reference point in the site coordinate system can be acquired. Thereby, the reference-point-information recording section 25A can record therein, in addition to geographic-coordinate-system coordinates of a reference point calculated at the geographic-coordinate-system reference-point-coordinate calculating section 23, and reference-point identification information acquired at the site-coordinate-system reference-point-coordinate identifying section 104, even site-coordinate-system coordinates of the reference point having the reference-point identification information as one set of reference point information.

The coordinate-conversion-parameter calculating section 26A uses, when there is a change in geographic-coordinate-system coordinates of a reference point recorded in the reference-point-information recording section 25A (i.e. when the geographic-coordinate-system coordinates of the reference point transmitted from the controller 100A is different from data having been recorded in the reference-point-information recording section 25A immediately before the transmission), the geographic-coordinate-system coordinates and the site-coordinate-system coordinates of the reference point to calculate (calibrate) the mutual coordinate conversion parameters Pr56 and Pr65 of the geographic coordinate system Co5 and the site coordinate system Co6. The coordinate conversion parameters Pr56 and 65 calculated by the coordinate-conversion-parameter calculating section 26A are output to the coordinate-conversion-parameter recording section 103.

The coordinate-conversion-parameter recording section 103 records therein the coordinate conversion parameters calculated at the coordinate-conversion-parameter calculating section 26A, along with a time of the calculation (i.e. a time of the update).

<Controller (No. 2)>

The information processing section 40A includes the recording section 41, the coordinate-conversion-parameter updating section 47, the site-coordinate-system-coordinate converting section 46, the information presentation control section 42, and the operation assist control section 43.

The coordinate-conversion-parameter updating section 47 checks at predetermined time intervals whether or not the coordinate conversion parameters recorded in the coordinate-conversion-parameter recording section 103 of the information recording server 101 have been updated, and, when they have been updated, acquires the latest coordinate conversion parameters recorded in the coordinate-conversion-parameter recording section 103 of the information recording server 101, and outputs them to the recording section 41.

The recording section 41 records therein the coordinate conversion parameter Pr56 input from the coordinate-conversion-parameter updating section 47, and the computerized construction data input from the input device 44. The coordinate conversion parameter Pr56 is used for control executed by the information presentation control section 42 and the operation assist control section 43.

<Processing Flow by Controller and Information Recording Server>

Figure 8:
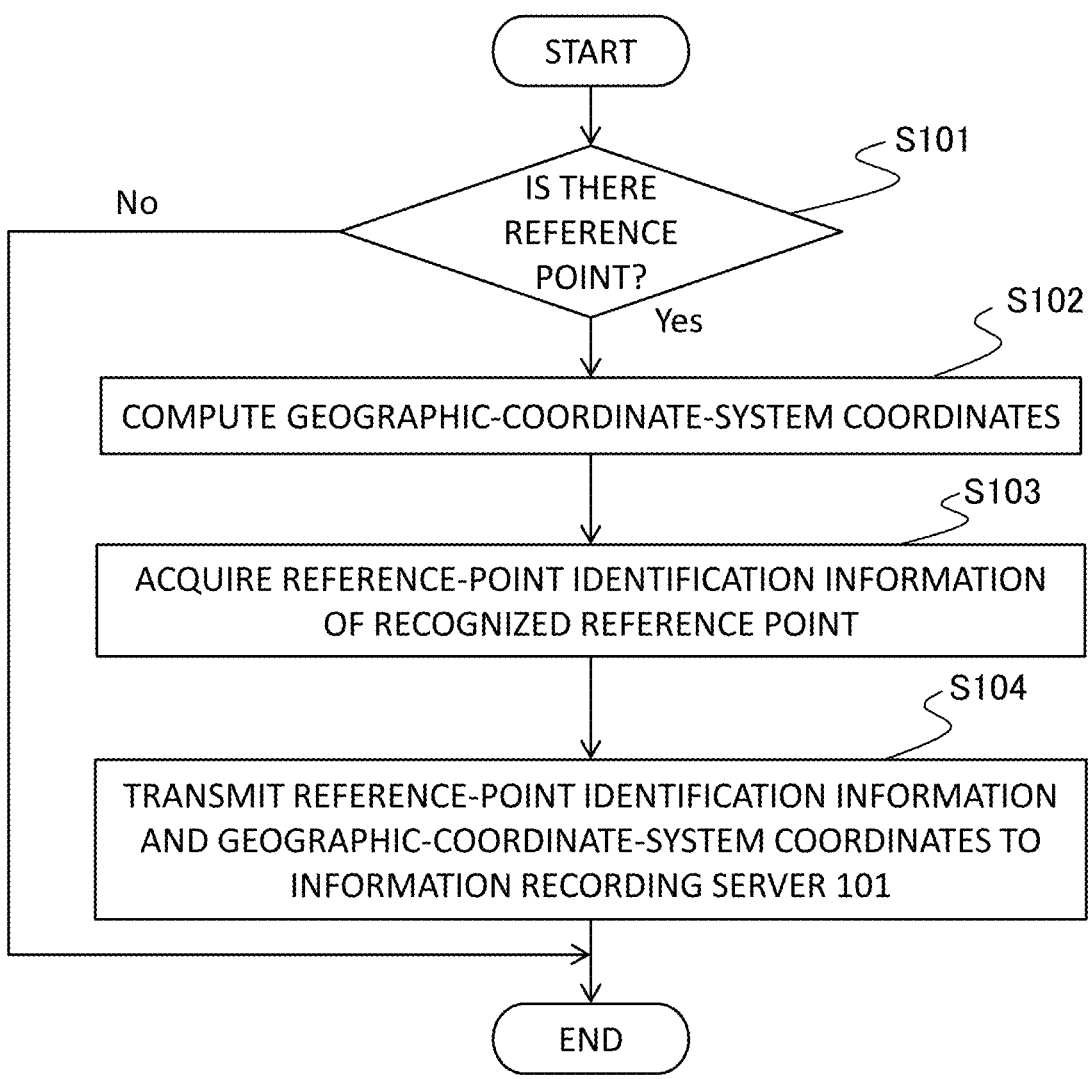
FIG. 8 is a flow diagram of a process executed by a data acquiring section of the controller in the second embodiment of the present invention.
Figure 9:
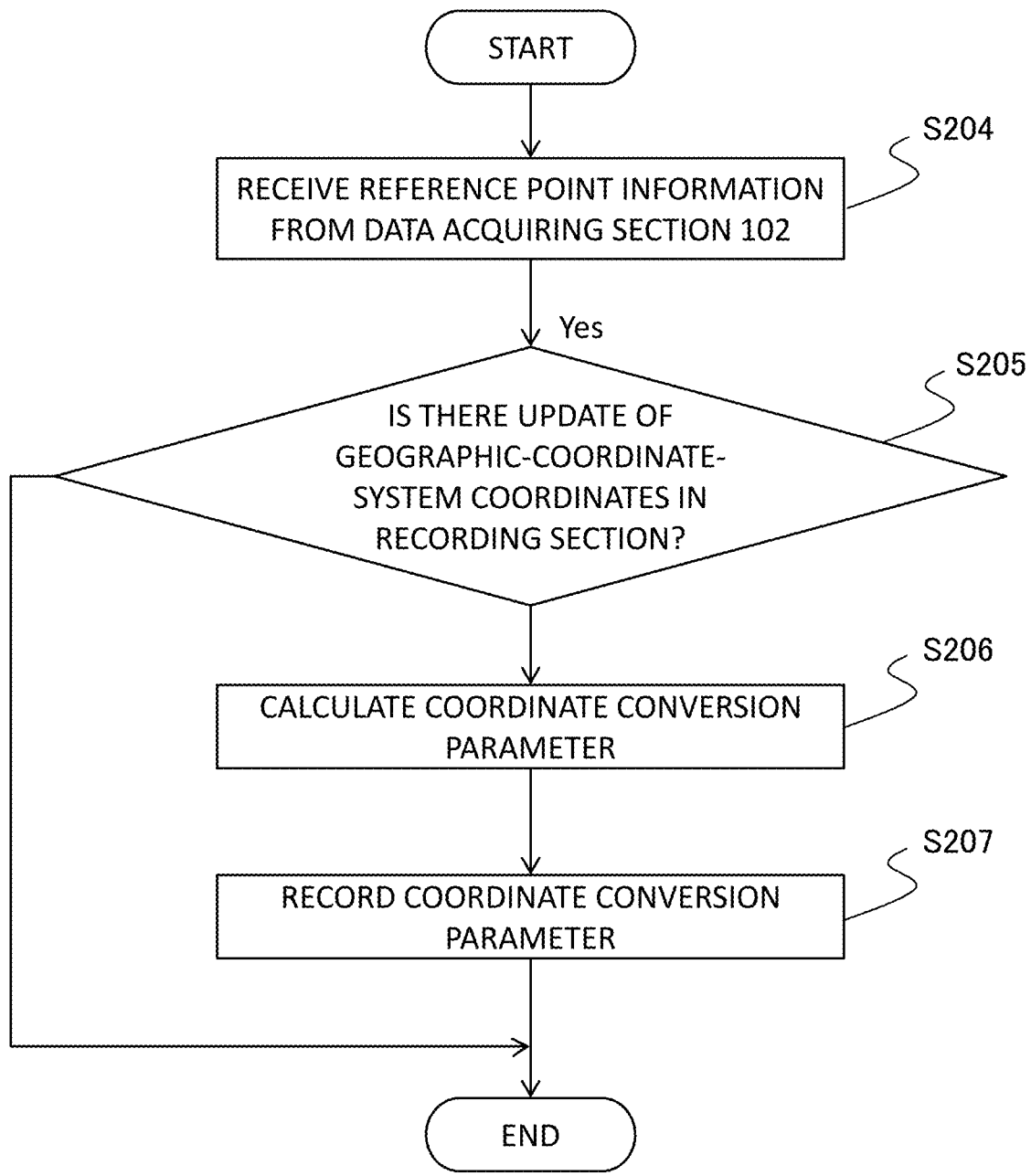
FIG. 9 is a flow diagram of a process executed by an information recording server in the second embodiment of the present invention.
Figure 10:
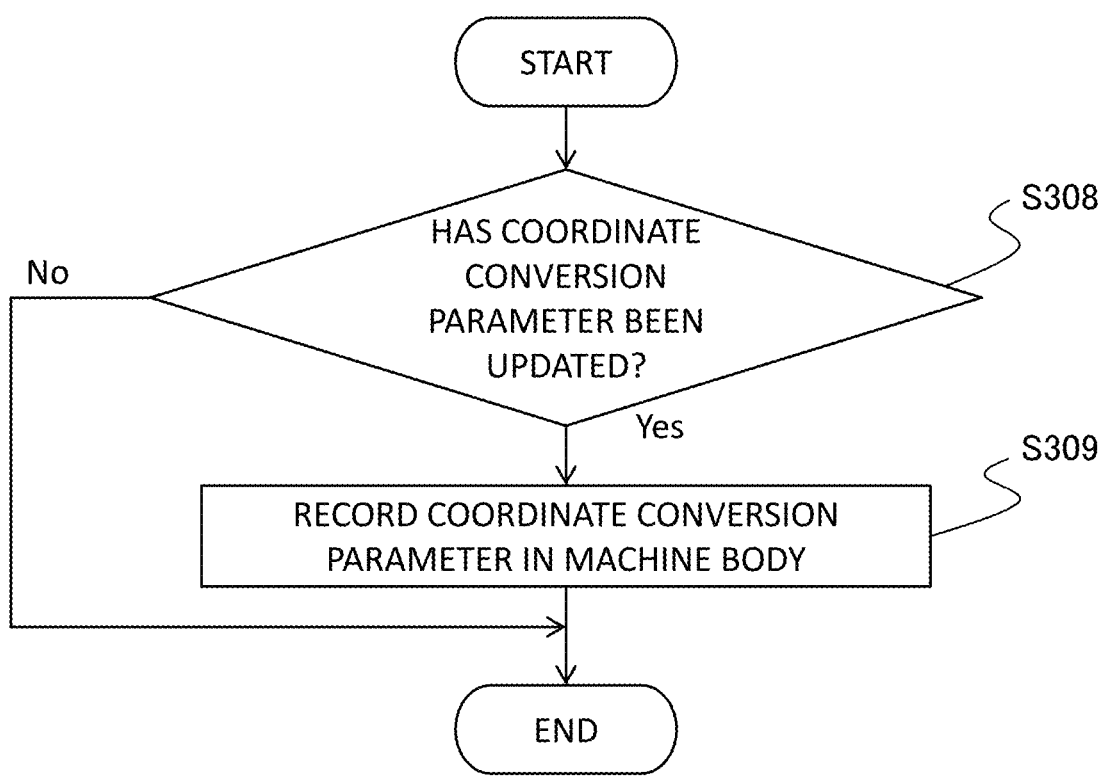
FIG. 10 is a flow diagram of a process executed by an information processing section of the controller in the second embodiment of the present invention.

Next, with reference to FIGS. 8, 9, and 10, the flow of processes performed by the data acquiring section 102 of the controller 100A, the information recording server 101, and the information processing section 40A of the controller 100A to calibrate the coordinate conversion parameter Pr56, and update the coordinate conversion parameter Pr56 recorded in the recording section 41 of the information processing section 40A is explained. Note that these processes are executed repeatedly at a predetermined cycle (e.g. at intervals of several minutes).

First, a process performed at the data acquiring section 102 of the controller 100A is explained by using FIG. 8.

When the process in FIG. 8 is started, at Step S101, first, the controller 100A (reference-point recognizing section 22) uses image recognition on an image captured by the image-capturing device 19, to decide whether or not there is a reference point in the image. When there is not a reference point in the image captured by the image-capturing device 19, the process is ended, and when there is a reference point, the process proceeds to Step S102.

At Step S102, the controller 100A (geographic-coordinate-system reference-point-coordinate calculating section 23) calculates the distance and direction from the image-capturing device 19 to the reference point SP by performing image processing on the image used at Step S101, and, on the basis of the distance and direction, and the geographic-coordinate-system coordinates of the image-capturing device 19 calculated at the geographic-coordinate-system machine-body-coordinate detecting section 31, calculates coordinates of the reference point in the geographic coordinate system Co5 at the time when the image has been captured, and the controller 100A proceeds to Step S103.

At Step S103, the controller 100A (site-coordinate-system reference-point-coordinate identifying section 104) acquires reference-point identification information on the reference point whose geographic-coordinate-system coordinates are calculated at S102, and proceeds to Step S104. Specifically, the site-coordinate-system coordinates of the reference point are acquired by a method in which an operator uses the input device 44 to directly input the reference-point identification information, a method of acquiring the reference-point identification information on a reference point having geographic-coordinate-system coordinates within a predetermined range from the geographic-coordinate-system coordinates calculated at S102 from reference points recorded in the reference-point-information recording section 25, a method of reading out information from an image of the reference point whose image is captured by the image-capturing device 19 and acquiring the reference-point identification information, or the like.

At Step S104, the controller 100A (data acquiring section 102) associates the geographic-coordinate-system coordinates of the reference point calculated at Step S102 with the reference-point identification information acquired at Step S103, transmits the associated geographic-coordinate-system coordinates and reference-point identification information to the information recording server 101 (reference-point-information recording section 25A), and ends the process.

Next, a process performed at the information recording server 101 is explained by using FIG. 9.

When the process of FIG. 9 is started, at Step S204, first, the information recording server 101 (reference-point-information recording section 25A) receives the identification information and the geographic-coordinate-system coordinates of the reference point transmitted from the controller 100A (data acquiring section 102), records therein the geographic-coordinate-system coordinates of the reference point recognized at the controller 100A (data acquiring section 102), and proceeds to Step S205.

At Step S205, the information recording server 101 proceeds to Step S6 when the geographic-coordinate-system coordinates of the reference point recorded in the reference-point-information recording section 25A at Step S204 have been updated to coordinates that are different from coordinates that had been recorded immediately before, and when the geographic-coordinate-system coordinates have not been updated, the information recording server 101 ends the process.

At Step S206, the information recording server 101 (coordinate-conversion-parameter calculating section 26) acquires, from the reference-point-information recording section 25A, the site-coordinate-system coordinates of the reference point whose geographic-coordinate-system coordinate are received at Step S204, and calculate the coordinate conversion parameter Pr56 for converting coordinates in the geographic coordinate system Co5 into coordinates in the site coordinate system Co6 on the basis of the geographic-coordinate-system coordinates and the site-coordinate-system coordinates of the reference point.

At Step S207, the information recording server 101 records the coordinate conversion parameter Pr56 calculated at Step S206 in the coordinate-conversion-parameter recording section 103, and ends the process.

Next, a process at the controller 100A (information processing section 40A) is explained by using FIG. 10.

When the process in FIG. 10 is started, at Step S308, the controller 100A (coordinate-conversion-parameter updating section 47) checks, at predetermined time intervals, whether or not the coordinate conversion parameter Pr56 recorded in the coordinate-conversion-parameter recording section 103 of the information recording server 101 has been updated. Specifically, the controller 100A transmits a signal for inquiring of the information recording server 101 whether or not there has been an update of the coordinate conversion parameter Pr56, and determines whether or not there has been an update on the basis of a response signal transmitted from the information recording server 101. Note that the controller 100A may determine whether or not there has been an update by receiving signals from the information recording server 101 at predetermined time intervals notifying on whether or not there has been an update. When the coordinate conversion parameter Pr56 has been updated, the process proceeds to Step S309, and when the coordinate conversion parameter Pr56 has not been updated, the process is ended.

At Step S309, the controller 100A (coordinate-conversion-parameter updating section 47) commands the information recording server 101 to transmit the latest coordinate conversion parameter Pr56 recorded in the coordinate-conversion-parameter recording section 103, and the controller 100A stores, in the recording section 41 (a storage device such as a ROM or a RAM), the coordinate conversion parameter Pr56 transmitted from the information recording server 101, and ends the process.

<Action/Advantages>

In the configuration above, the controllers 100A of the plurality of hydraulic excavators 1 that are present at the work site and the information recording server 101 are connected to each other by a network, and each controller 100A transmits at least geographic-coordinate-system coordinates and reference-point identification information of a reference point to the information recording server 101. Then, when there has been a change in the geographic-coordinate-system coordinates of the reference point transmitted from each controller 100A, the information recording server 101 calculates the coordinate conversion parameter Pr56 on the basis of the geographic-coordinate-system coordinates and the site-coordinate-system coordinates of the reference point, and performs a data update by recording the coordinate conversion parameter Pr56 in the coordinate-conversion-parameter recording section 103 in the information recording server 101. Each controller 100A inquires of the information recording server 101 at predetermined intervals whether or not there has been an update of the coordinate conversion parameter Pr56. When there has been an update, the controller 100A downloads the latest coordinate conversion parameter Pr56 from the information recording server 101, and the latest coordinate conversion parameter Pr56 can be used in control at the information presentation control section 42 and the operation assist control section 43.

Thereby, even when there is a hydraulic excavator (e.g. a second hydraulic excavator in FIG. 4) that cannot capture an image of a reference point (reference-point display tool) with an image-capturing device 19 in the plurality of hydraulic excavators 1 that are active at the work site, the arrangement of satellites changes during a period in which the second hydraulic excavator cannot capture the image, and geographic-coordinate-system coordinates (a satellite positioning result) vary, it is possible to download the coordinate conversion parameter Pr56 calibrated by the information recording server 101 on the basis of geographic-coordinate-system coordinates acquired by another hydraulic excavator (e.g. a first hydraulic excavator in FIG. 4) that could capture an image of any of reference points (reference-point display tools) during the period. That is, even in a condition where a certain hydraulic excavator 1 cannot capture an image of a reference point, it becomes possible promptly to use the coordinate conversion parameter Pr56 updated (calibrated) on the basis of information from another hydraulic excavator 1 that can capture an image of a reference point, and thus it is possible to improve the precision of calculation of control points and the construction precision of the entire hydraulic excavators that are active at the work site.

In addition, since site-coordinate-system coordinates of reference points are centrally managed by the information recording server 101 in the embodiment described above, it becomes unnecessary to register or store site-coordinate-system coordinates of the reference points on the side of hydraulic excavators 1, and the burden of operation by users or operators can be reduced.

In addition, in the embodiment described above, when the controller 100A of each hydraulic excavator 1 is notified by the information recording server 101 that the coordinate conversion parameter Pr56 has been calibrated, the controller 100A of each hydraulic excavator 1 receives the calibrated coordinate conversion parameter Pr56, and uses the received coordinate conversion parameter Pr56 to perform coordinate conversion of control points. Thereby, when there has been an update of the coordinate conversion parameter Pr56, the updated coordinate conversion parameter Pr56 is downloaded promptly to the controller 100A of each hydraulic excavator 1, and thus it can be used for various types of control immediately.

<Others>

Note that the present invention is not limited to the embodiments described above, and includes various modification examples within the scope not deviating from the gist of the present invention. For example, the present invention is not limited to those including all the configurations explained in the embodiments described above, but also includes those from which some of the configurations are removed. In addition, some of configurations related to an embodiment can be added to or replaced with configurations according to another embodiment.

For example, while the coordinate conversion system including the controller 100, the image-capturing device 19, and the GNSS antennas 17a and 17b are mounted on the hydraulic excavator 1 in the first embodiment explained above, this configuration is not an essential matter. That is, the coordinate conversion system including the controller 100, the image-capturing device 19, and the GNSS antennas 17a and 17b may be provided separately from the hydraulic excavator 1, and the coordinate conversion system may be configured to transmit coordinate conversion parameters calculated at the coordinate conversion system to the hydraulic excavator 1. In the second embodiment also, similarly, a plurality of the coordinate conversion systems each including the controller 100, the image-capturing device 19, and the GNSS antennas 17a and 17b may be provided in a work site, and the coordinate conversion systems may be configured to transmit coordinate conversion parameters calculated at the coordinate conversion systems to the information recording server 101.

While the reference-point-information recording section 25A and the coordinate-conversion-parameter calculating section 26A are provided on the side of the information recording server 101 in the second embodiment, these may be provided on the side of the controller 100A similarly to the first embodiment. That is, the coordinate conversion parameter Pr56 is calculated on the side of the controller 100A, and only the coordinate conversion parameter Pr56 may be transmitted to the information recording server 101, and recorded in the coordinate-conversion-parameter recording section 103, in one possible configuration that may be adopted.

In addition, while the controller 100A transmits identification information (reference-point identification information) not including site-coordinate-system coordinates of reference points to the information recording server 101 in the second embodiment, instead of reference-point identification information, site-coordinate-system coordinates of reference points may be transmitted similarly to the first embodiment, in one possible configuration that may be adopted.

In addition, while it is determined on the side of the information recording server 101 (coordinate-conversion-parameter calculating section 26A) whether or not there has been a change in a geographic coordinate system of a reference point in the second embodiment, a system may be configured such that the geographic-coordinate-system reference-point-coordinate calculating section 23A of the controller 100A of each hydraulic excavator 1 determines whether or not there has been a change, and, only when there has been a change, geographic-coordinate-system coordinates are transmitted to the information recording server 101.

Note that while each hydraulic excavator 1 eventually performs various types of control by the information presentation control section and the operation assist control section on the basis of site-coordinate-system coordinates in each embodiment described above, each hydraulic excavator 1 may eventually execute various types of control on the basis of geographic-coordinate-system coordinates. That is, a system may be configured to use not only the coordinate conversion parameter Pr56 for converting coordinates in the geographic coordinate system Co5 into coordinates in the site coordinate system Co6, but also the coordinate conversion parameter Pr65 for converting coordinates in the site coordinate system Co6 into coordinates in the geographic coordinate system Co5.

In addition, configurations related to the controllers 100 and 100A, and the server 101 described above, and the functions, executed processes and the like of the configurations may partially or entirely be realized by hardware (e.g. by designing logics to execute the functions by an integrated circuit or by other means). In addition, the configurations related to the controllers 100 and 100A, and the server 101 described above may be a program (software) that is read out and executed by a calculation processing device (e.g. a CPU), and thereby realizes the functions related to the configurations of the controller/server. Information related to the program can be stored on a semiconductor memory (a flash memory, an SSD, and the like), a magnetic storage device (a hard disk drive, and the like), a recording medium (a magnetic disk, an optical disk, and the like) or the like, for example.

In addition, in the explanation of the embodiments described above, control lines and information lines that are understood to be necessary for the explanation of the embodiments are illustrated, but they are not necessarily all the control lines and information lines related to a product. Actually, it may be considered that almost all the configurations are interconnected.

DESCRIPTION OF REFERENCE CHARACTERS

1: Hydraulic excavator (work machine)
1A: Work implement (front work implement)
1B: Machine body
1BA: Upper swing structure
1BB: Lower track structure
2: Boom
3: Arm
4: Bucket
5: Boom cylinder
6: Arm cylinder
7: Bucket cylinder
10, 11: Operation lever
12: Boom-angle sensor (posture sensor)
13: Arm-angle sensor (posture sensor)
14: Bucket-angle sensor (posture sensor)
16: Inclination angle sensor (posture sensor)
17: GNSS antenna
18: Display monitor (display device)
19: Image-capturing device
20: Proportional solenoid valve
100: Controller
101: Information recording server

The invention claimed is:

1. A work machine including a controller that is configured to convert geographic-coordinate-system coordinates of a certain point into site-coordinate-system coordinates by using a coordinate conversion parameter generated on a basis of geographic-coordinate-system coordinates and site-coordinate-system coordinates of a reference point installed at a work site, the work machine comprising:
   a machine body;
   a work implement that is attached to the machine body, and is driven by a hydraulic cylinder;
   an image-capturing device that captures an image of the reference point;
   a GNSS antenna that is attached to the machine body, and receives a navigation signal; and
   a posture sensor that detects a posture of the work implement, wherein
   the controller is configured to
      calculate geographic-coordinate-system coordinates of the image-capturing device on a basis of the navigation signal received at the GNSS antenna, and a distance between the image-capturing device and the GNSS antenna,
      calculate a distance and direction from the image-capturing device to the reference point by performing image processing on the image of the reference point captured by the image-capturing device,
      calculate the geographic-coordinate-system coordinates of the reference point on a basis of the calculated distance and direction from the image-capturing device to the reference point, and the calculated geographic-coordinate-system coordinates of the image-capturing device, calibrate the coordinate conversion parameter on a basis of the calculated geographic-coordinate-system coordinates of the reference point, and the site-coordinate-system coordinates of the reference point, calculate geographic-coordinate-system coordinates of the machine body on a basis of the navigation signal received at the GNSS antenna, calculate geographic-coordinate-system coordinates of a control point set for the work implement on a basis of the geographic-coordinate-system coordinates of the machine body, and information about the posture of the work machine detected by the posture sensor, convert the geographic-coordinate-system coordinates of the control point into site-coordinate-system coordinates by using the coordinate conversion parameter calibrated by the controller, and perform control on a basis of the converted site-coordinate-system coordinates.

2. The work machine according to claim 1, wherein information about the site-coordinate-system coordinates of the reference point is embedded in a marker installed at the reference point, the image-capturing device captures an image of the marker along with the image of the reference point, and the controller acquires the site-coordinate-system coordinates of the reference point on a basis of the image of the reference point and the image of the marker captured by the image-capturing device.

3. The work machine according to claim 1, wherein the controller associates the geographic-coordinate-system coordinates of the reference point calculated by the controller with identification information of the reference point, and outputs the associated geographic-coordinate-system coordinates and identification information to a server connected to the controller via a network.

4. The work machine according to claim 1, wherein the controller is configured to perform coordinate conversion by using the calibrated coordinate conversion parameter when the coordinate conversion parameter is calibrated by the controller.

5. The work machine according to claim 1, wherein the image-capturing device is pivotable in an upward/downward direction, and a leftward/rightward direction, and the controller controls a direction of the image-capturing device such that the reference point is always included in an image-capturing range of the image-capturing device.

6. The work machine according to claim 1, wherein the controller causes a positional relation between the control point and a predetermined target surface in the converted site-coordinate-system coordinates to be displayed on a monitor.

7. The work machine according to claim 6, wherein the controller controls the hydraulic cylinder such that the work implement is positioned above the target surface.

8. The work machine according to claim 6, wherein the controller associates the geographic-coordinate-system coordinates of the reference point calculated by the controller with identification information of the reference point, and outputs the associated geographic-coordinate-system coordinates and identification information to a server connected to the controller via a network.

9. The work machine according to claim 8, wherein the controller receives the calibrated coordinate conversion parameter, and is configured to perform coordinate conversion of the control point by using the received coordinate conversion parameter when the controller is notified that the coordinate conversion parameter has been calibrated from the server that calibrates the coordinate conversion parameter on a basis of the geographic-coordinate-system coordinates and the site-coordinate-system coordinates of the reference point when the geographic-coordinate-system coordinates of the reference point have been updated.

10. The work machine according to claim 1, wherein the controller is configured to repeatedly execute, at a predetermined cycle, a calibration process of the coordinate conversion parameter based on the calculated geographic-coordinate-system coordinates of the reference point, and the stored and identified site-coordinate-system coordinates of the reference point.

* * * * *